(12) United States Patent
Makhija et al.

(10) Patent No.: US 12,008,497 B2
(45) Date of Patent: Jun. 11, 2024

(54) DEMAND SENSING AND FORECASTING

(71) Applicant: NB Ventures, Inc., Clark, NJ (US)

(72) Inventors: Subhash Makhija, Westfield, NJ (US); Vanamali Porethi, Hyderabad (IN); Kiran Kumar Kandula, Hyderabad (IN); Vengatakrishnan Narayanasamy, Chestnut Hill, MA (US); Shivendra Singh Malik, Mumbai (IN)

(73) Assignee: NB Ventures, Inc., Clark, NJ (US)

( * ) Notice: Subject to any disclaimer, the term of this patent is extended or adjusted under 35 U.S.C. 154(b) by 0 days.

(21) Appl. No.: 17/110,922

(22) Filed: Dec. 3, 2020

(65) Prior Publication Data

US 2022/0180274 A1    Jun. 9, 2022

(51) Int. Cl.
| | |
|---|---|
| G06Q 10/0631 | (2023.01) |
| G06F 16/215 | (2019.01) |
| G06F 16/23 | (2019.01) |
| G06F 16/28 | (2019.01) |
| G06N 3/044 | (2023.01) |
| G06N 3/045 | (2023.01) |
| G06N 3/088 | (2023.01) |
| G06Q 10/087 | (2023.01) |
| G06Q 30/0201 | (2023.01) |
| G06Q 30/0202 | (2023.01) |

(52) U.S. Cl.
CPC ..... *G06Q 10/06315* (2013.01); *G06F 16/215* (2019.01); *G06F 16/2365* (2019.01); *G06F 16/285* (2019.01); *G06N 3/044* (2023.01); *G06N 3/045* (2023.01); *G06N 3/088* (2013.01); *G06Q 10/087* (2013.01); *G06Q 30/0201* (2013.01); *G06Q 30/0202* (2013.01)

(58) Field of Classification Search
None
See application file for complete search history.

(56) References Cited

U.S. PATENT DOCUMENTS 6,668,253 B1 * 12/2003 Thompson ............. G06Q 10/06
8,214,238 B1 *  7/2012 Fairfield ............. G06Q 10/0639
                                                    705/7.11

(Continued)

FOREIGN PATENT DOCUMENTS

CN        110392899 A  * 10/2019  ............. G06F 17/10
WO    WO-2020046497 A1 *  3/2020  ............. G06Q 10/04

OTHER PUBLICATIONS

Beutel, Anna-Lena, and Stefan Minner. "Safety stock planning under causal demand forecasting." International Journal of Production Economics 140.2 (2012): 637-645. (Year: 2012).*

(Continued)

*Primary Examiner* — Thomas L Mansfield
(74) *Attorney, Agent, or Firm* — BrownWinick Law Firm; David M. Breiner

(57) ABSTRACT

The present invention provides a data processing system and method for demand sensing and forecasting. The invention includes generating hierarchical data set from historical data of one or more objects and processing the hierarchical data based on one or more forecasting data models created by an artificial engine to predict data trend. The invention determines required safety stock for each category of the one or more objects.

41 Claims, 20 Drawing Sheets

(56) References Cited

U.S. PATENT DOCUMENTS

| | | | | |
|---|---|---|---|---|
| 8,271,889 | B1* | 9/2012 | Beckert | G06F 8/65 715/762 |
| 10,267,951 | B2* | 4/2019 | Lemos | G06Q 50/02 |
| 11,038,908 | B2* | 6/2021 | Vega | H04L 63/30 |
| 11,048,564 | B2* | 6/2021 | Dhondse | G06N 3/082 |
| 2006/0111963 | A1* | 5/2006 | Li | G06Q 10/04 705/7.31 |
| 2008/0177599 | A1* | 7/2008 | McPhetrige | G06Q 30/0202 705/7.31 |
| 2011/0060655 | A1* | 3/2011 | Novak | G06Q 30/08 705/26.1 |
| 2013/0290150 | A1* | 10/2013 | Weerahandi | G06Q 10/08 705/28 |
| 2015/0161180 | A1* | 6/2015 | Hermanns | G06F 8/20 707/810 |
| 2018/0165554 | A1* | 6/2018 | Zhang | G06N 3/0454 |
| 2019/0008468 | A1* | 1/2019 | Liu | A61B 6/037 |
| 2019/0102465 | A1* | 4/2019 | Yang | G06F 16/9535 |
| 2019/0188536 | A1* | 6/2019 | Lei | G06F 17/10 |
| 2020/0019882 | A1* | 1/2020 | Garg | G06F 3/0484 |
| 2020/0074267 | A1* | 3/2020 | Salama | G06N 3/04 |
| 2020/0074485 | A1* | 3/2020 | Popescu | G06Q 30/0202 |
| 2021/0049460 | A1* | 2/2021 | Ahn | G06N 7/005 |
| 2021/0125207 | A1* | 4/2021 | Banerjee | G06Q 10/04 |
| 2021/0157860 | A1* | 5/2021 | Li | G06F 16/9038 |

OTHER PUBLICATIONS

Gonçalves, João NC, M. Sameiro Carvalho, and Paulo Cortez. "Operations research models and methods for safety stock determination: A review." Operations Research Perspectives 7 (2020): 100164. (Year: 2020).*

* cited by examiner

DEMAND SENSING AND FORECASTING

BACKGROUND

1. Technical Field

The present invention relates generally to demand sensing in supply chain. More particularly, the invention relates to data processing systems, methods and computer program product for demand sensing and forecasting in supply chain.

2. Description of the Prior Art

Forecasting demand of a product is a challenging problem. Organizations spend huge amount of time and effort in identifying the right product for the market. Also, supply chain operations are dependent on the accurate estimates of demand to facilitate appropriate supply of the products. It is important that the demand forecasts are extremely accurate enabling organization to achieve high service levels and maintaining optimum safety stock through appropriate inventory management.

Dependency on demand planner is high to undertake strategic approach to supply chain management. Recognizing the demand for materials or services before it arises and having a good sense of inventory is essential. The key here is structured and unstructured information that can help define the scope and baseline. While there are several methods and systems that deal with structured and unstructured data, the approach required for a Supply chain related demand sensing process is considerably different due to the unknowns and interdependency of multiple functions on each other.

There are multiple dimensions when it comes to planning demand for an object. Companies need to generate the long-term demand plan for planning capacities for factories, and manufacturing and support network. This also aids in financial/budgetary planning. When it comes to mid-term planning, companies need to plan at unit level for the object/products/product groups that company is manufacturing or transporting or selling in the market. Companies use those demand plans to plan for transportation and manufacturing and making decisions around where to place inventory for appropriate inventory management. On the other hand, for the near term, plan at a specific product level is critical to make decisions around discontinuing manufacture and placing the right quantities of products with right channel partners or retail stores. Depending on the nature of the requirement the level of planning varies. Also, the datasets that need to be processed at different levels are represented on multiple dimensions such as product hierarchy, company divisions/business units, regions/locations etc.

Further, the datasets to be processed for forecasting demand vary in nature. Certain large data sets spanning across several years with varying promotional and seasonal effects, exhibit several peculiarities that set them apart from any other demand forecasting data sets. While there are methods for computing forecasts for different products, it is unknown whether the exogenous features are affecting the demand for an item/object. The data is intermittent which makes it difficult for a demand planner to identify the right frequency for forecast. It becomes extremely critical for computing systems to accommodate for real time data fluctuations to predict demand.

In view of the above problems, there is a need for system and method of data processing for demand sensing and forecasting in supply chain that can overcome the problems associated with the prior arts.

SUMMARY

According to an embodiment, the present invention provides a data processing method for demand sensing and forecasting. The method includes receiving and storing at a data lake, a plurality of historical data from an entity, generating a hierarchical dataset from the received historical data wherein a bot creates a data script based on the received data for generating the hierarchical dataset by utilizing a library of functions stored on a functional database. The method includes creating one or more forecasting data models by an AI engine for processing the hierarchical data set to predict data trend; analyzing by the AI engine, processing results of the one or more forecasting data models at each level of the hierarchal data set to generate a prediction data model, identifying by a neural network, one or more data attribute weights assigned to the prediction data model at each level of the hierarchical data set and processing the identified weights to determine an optimum data attribute weight for the prediction data model and predicting demand of one or more objects based on the optimized prediction data model associated with the hierarchal data set.

In an embodiment, the one or more forecasting models include a Stochastic time series data model, time series univariate forecasting data model with error, trend and seasonal model, and random walk data model.

In an embodiment, the data processing method of the invention includes training the one or more forecasting models by fetching a plurality of codes from a set of normalized historical data, extracting a plurality of distinct data from the normalized historical data to create a list of variables, transforming the normalized historical data into the data matrix using the list of variables, and creating one or more training model from the code and the data matrix using machine learning (ML) and artificial intelligence (AI) for training the one or more forecasting models.

In an embodiment, the data processing method includes dividing the hierarchical dataset into training data set and testing data set at the different levels in the hierarchical data set, generating forecasting data for the testing data using the training data set at each level through the one or more forecasting data models, providing the forecasting data as input to the neural network and testing data as the output to identify the one or more data attribute weights, and determining the optimum data attribute weight from the identified one or more data attribute weights by using a squared loss function of the neural network.

In an embodiment, the data processing method of the invention includes generating a forecast at each level in the hierarchical data set by using a top-down approach such that a summation of forecasts at a top level in the hierarchical data set is also summation of the forecast at a bottom level. The top-down approach works with hierarchical aggregation structures wherein the forecast for a total series at the top level is generated and then disaggregated down the hierarchy.

In an embodiment, the data processing method of the invention includes generating a forecast at each level in the hierarchical data set by using a bottom-up approach such that first the forecast for each series at the bottom-level is generated and then a summation of these produce forecasts for all the series in the structure.

In an exemplary embodiment, the data processing method of the invention estimates a required sub-stock of one or more components of the object based on predicted demand of the object where the AI engine is configured to assess a demand data pattern of the components based on the predicted demand of the object by the one or more forecasting data models.

In an embodiment, the data processing method of the invention includes execution of supply chain operations such as demand planning, supply planning, and inventory management. The execution of inventory management operation includes the steps of determining required safety stock of the one or more objects based on analysis of the predicted demand and one or more operational characteristics of the one or more objects, assigning by an inventory bot, data attribute weights to the one or more operational characteristics at different levels of analytic hierarchy, processing by an AI engine, the data attribute weights to categorize and classify the one or more objects based on the demand, based on the classification, determining the required safety stock for each category of the one or more objects.

In an embodiment, the present invention provides a data processing system for demand sensing and forecasting. The system includes a server configured to receive a plurality of historical data from an entity and storing the data at a data lake, a processor for generating a hierarchical dataset from the received historical data wherein a bot creates a data script based on the received data for generating the hierarchical dataset by utilizing a library of functions stored on a functional database. The system includes an AI engine coupled to the processor and configured for creating one or more forecasting data models based on the hierarchical data set for predicting demand of one or more objects wherein the AI engine analyzes processing results of the one or more forecasting data models at each level of the hierarchal data set to generate a prediction data model. The system also includes a neural network configured to identify one or more data attribute weights assigned to the prediction data model at each level of the hierarchical data set and processing the identified weights to determine an optimum data attribute weight for the prediction data model wherein a demand of the one or more objects is predicted based on the optimized prediction data model associated with the hierarchal data set.

In an embodiment, the system of the invention includes a LSTM layer embedded between auto encoder and decoder of the neural network for identifying temporal variations in testing data and determining data attribute weights considering the variations.

In an advantageous aspect, the present invention utilizes Machine Learning algorithms, prediction data models, Poisson distribution, bootstrapping methodology and data analysis.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
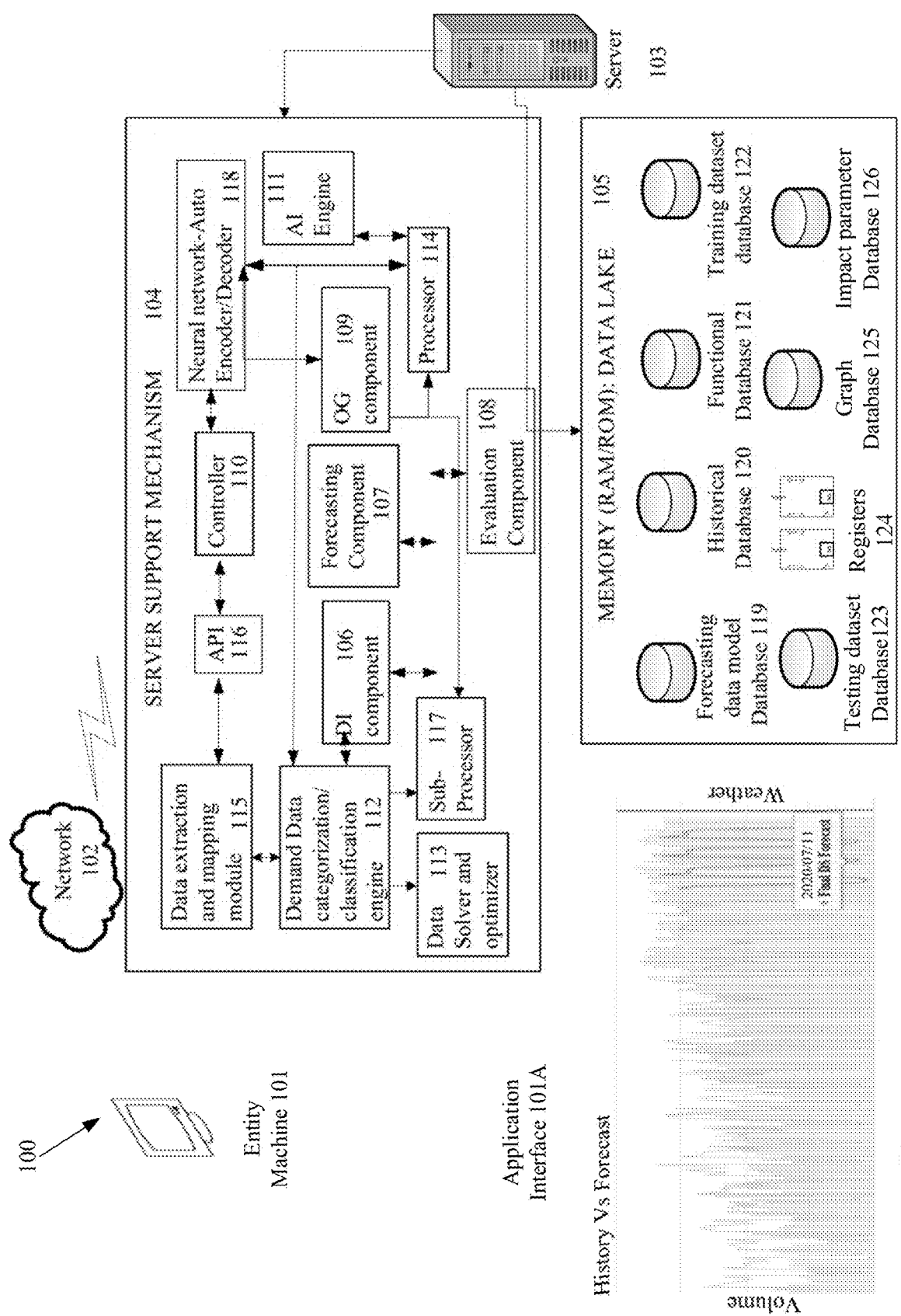
FIG. 1 is a view of a data processing system for demand sensing and forecasting in accordance with an embodiment of the invention.

Described herein are the various embodiments of the present invention, which includes data processing method and system for demand sensing and forecasting in supply chain.

The various embodiments including the example embodiments will now be described more fully with reference to the accompanying drawings, in which the various embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the sizes of components may be exaggerated for clarity.

It will be understood that when an element or layer is referred to as being "on," "connected to," or "coupled to" another element or layer, it can be directly on, connected to, or coupled to the other element or layer or intervening elements or layers that may be present. As used herein, the term "and/or" includes any and all combinations of one or more of the associated listed items.

Spatially relative terms, such as "hierarchical data," "data attribute," or "data lake," and the like, may be used herein for ease of description to describe one element or feature's relationship to another element(s) or feature(s) as illustrated in the figures. It will be understood that the spatially relative terms are intended to encompass different orientations of the structure in use or operation in addition to the orientation depicted in the figures.

The subject matter of various embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, the various embodiments including the example embodiments relate to a data processing system and method for demand sensing and forecasting in supply chain.

Referring to FIG. 1, a system 100 for demand sensing and forecasting is provided in accordance with an embodiment of the present invention. The system 100 includes at least one entity machine 101 with a user interface 101A for sending, receiving, modifying or triggering processing of one or more object data over a network 102. The system includes a server 103 configured to receive data and instructions from the entity. The system 100 includes a support mechanism 104 for performing demand sensing and forecasting process with multiple functions including historical data extraction, classification and structuring of data attributes for analysis of data, creation of one or more forecasting data models configured to process different parameters including demand data, impact data, historical data etc. The system 100 includes a data store/data lake 105 for accessing object such as item or services related data from entities and storing plurality of training forecasting data models created by support mechanism 104.

In an embodiment the server 103 of the invention may include various sub-servers for communicating and processing data across the network. The sub-servers include but are not limited to content management server, application server, directory server, database server, mobile information server and real-time communication server.

In an embodiment the entity machine 101 may communicate with the server 103 wirelessly through communication interface, which may include digital signal processing circuitry. Also, the entity machine 101 may be implemented in a number of different forms, for example, as a smartphone, computer, personal digital assistant, or other similar devices.

In an exemplary embodiment, the user interface 101A of the entity machine 101 enables cognitive computing to improve interaction between user and an enterprise or supply chain application(s). The interface 101A improves the ability of a user to use the computer machine itself. For Example, the interface 101A may display data in graphical form as illustrated in FIG. 1D as graph 100D. Since, the interface 101A provides actionable insights into various category of demand information including but not limited to frequency of forecast such as long range forecast data, short range forecast data, multi-model forecast data, decomposition, lag etc., at the same instant, the interface thereby enables a user to take informed decision or undertake an appropriate strategy for inventory management. The user interface 101A triggers a plurality of predictive data models to identify one or more category of objects for forecasting the demand. By eliminating multiple layers, processing tasks and recordation of information to get a desired data or functionality, which would be slow, complex and impractical to learn, particularly to a user without deep knowledge of the subject, the user interface 101A is more user friendly and improves the functioning of the existing computer systems.

In an example embodiment, the support mechanism 104 of the system 100 includes a control interface for accessing demand related information received at the server 103. The support mechanism enables implementation of the system on top of a big data tool and leverages abstraction for distributed computing. The unified system 100 with a single codebase with support mechanism 104 provide loosely coupled components, that run independently from each other, while exchanging data via a distributed file system. The mechanism 104 includes a data integration (DI) component 106 configured to access a plurality of external data sources, typically from distributed storage like Data Lake, provides data cleaning and enrichment and joins the input data to a distributed denormalized table where each row contains all data for an object/item. The mechanism further provides a forecasting component 107 including a distribution component that is implemented in big data tool, a feature transformation component, machine learning algorithms and an orchestration layer that leverages a high-level dataflow abstraction to model machine learning pipelines. The distribution component assigns groups of items to one or more dedicated learning algorithms. Each learner has a feature transformation (forming features based on the hierarchy) flow as well as pre and post processing logic associated with it. The feature transformation turns data into sparse matrices and provides customized as well as standard transformations (crossing, binning, normalization, etc.) along the way. The learner invocation consists of a training and a prediction phase, where the former phase uses statistics-based time series models and additive model-based libraries, and the latter applies sampling methods. The outputs of all learners are then consolidated into a single set of sample paths by ensemble methods. The forecasting component 107 also has the statistics methods like hypothesis tests which outputs the significance of exogenous features. The objects/items with the product hierarchy are trained and validated on multiple algorithms enabling the forecast component 107 also outputs most important demand items, intermittent items and noise items. The forecasting component 107 additionally supports generating reports which provide visualizations and summaries of learner algorithms.

The support mechanism further includes an evaluation component 108, configured to consolidate all evaluation related code in a central place. This is crucial to guarantee consistency and safeguard against errors. For ML applications, errors in evaluations are much greater than errors in models or algorithms. Consistency, for example, is important in handling edge cases, and for non-standard definitions such as quantiles of count distributions. The evaluation component 108 operates on subset of the data. The number of predictions which are made by taking the subset of data is same as the number of forecasts. Since, evaluation is computationally expensive, computation of a host of metrics at the same time in the evaluation is performed to avoid multiple runs over the data and persist the resulting evaluation data. Additionally, they system 100 is configured to provide summary and visualizations of the evaluation data in a reporting dashboard.

The support architecture 104 further includes an OG (Output generation) 109 component configured to consume sample paths generated by the forecasting components 107 and enrich them with useful end user information like forecasts, key recommendations.

Figure 1A:
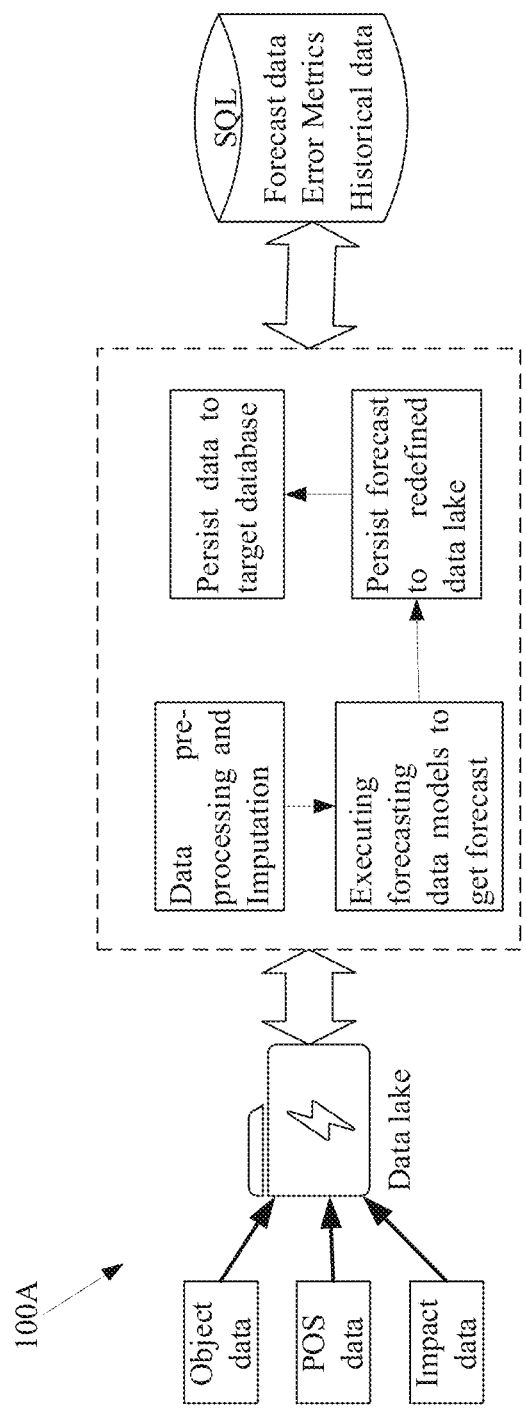
FIG. 1A is a sub architecture system block diagram of the demand sensing and forecasting pipeline in accordance with an example embodiment of the invention.

Referring to FIG. 1A, a sub architecture system block diagram 100A of the demand sensing and forecasting pipeline is shown in accordance with an example embodiment of the invention. The system 100A includes input dataset of object data such as Sales Historical dataset stored in the data lake 105. The input object data is categorized to object category (Cat 1/Obj cat), object description is modified to remove duplicate texts and maintain consistent names. The renaming of object description as object type is performed. The object number is used, and the magnitude of sales is the required output variable or column to be forecasted based on the hierarchy. The hierarchy are visualized in reference data.

Figure 1B:
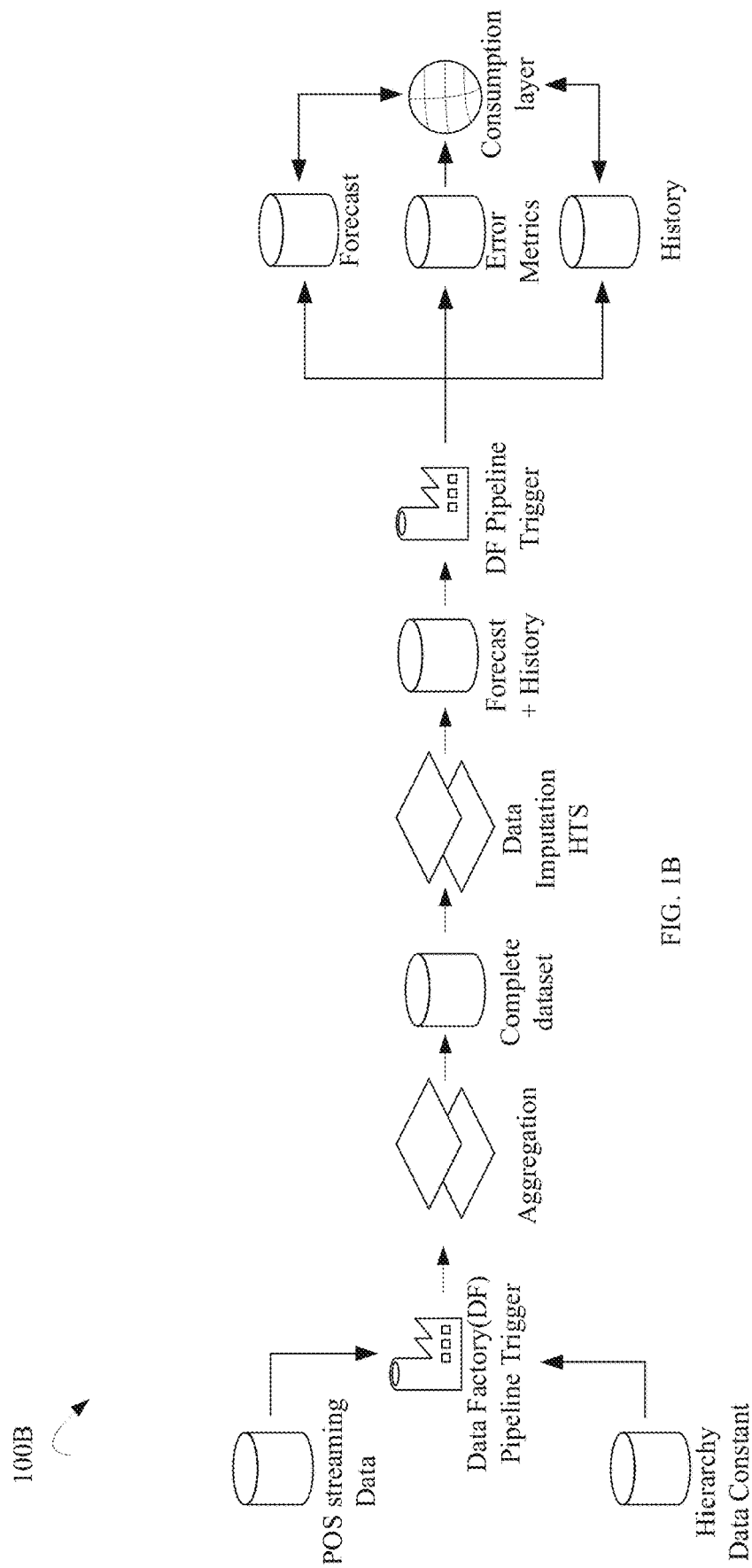
FIG. 1B is an architecture flow diagram of the demand sensing and forecasting system in accordance with an embodiment of the invention.

Referring to FIG. 1B, an architecture flow diagram 100B of demand sensing and forecasting system is shown in accordance with an embodiment of the invention. The system provides Point of Sales (POS) Data, which is input dataset available as continuous source/event stream for day wise demand forecast. The weather dataset is also available as input dataset to the system 100B. Impact data such as historical weather data and weather forecast for next few days from current date is fetched from the data lake 105. The system 100B includes Data Factory (DF) pipeline that fetches the object data from the data lake, cleans the object data and weather dataset and imputes data with a code writer. The system pipeline also reads the Weather data (History and Forecast) from existing weather data and prepares the holidays list for required date range. The cleansed and imputed dataset and holidays datasets are then fed to one or more hierarchical timeseries data model. The data models run and computes forecasts, error metrics persisting in the data lake in specified conformed zones/ location. The system populates the respective SQL database tables from the data models to compute forecast and metrics. The SQL database tables can be consumed further at consumption layer. The database table is being used by the demand planning user interface 101A.

Referring to FIGS. 1, 1A and 1B, the system includes loosely coupled components which all run on big data tool and exchange data via a distributed filesystem. The Demand Planning Data lake component fetches data from several data sources, cleans and joins this data and produces datasets comprised of item features and historical demand. The big data tool and data factory (DF) pipeline also contains most of the machine learning logic, which is in executing the one or more forecasting data models including a Stochastic time series data model, time series univariate forecasting data model with error, trend and seasonal model, and random walk data model to get forecast. It transforms the demand data into feature data matrix representation and allows training of a variety of forecasting models on the data. The system enables ensemble of the one or more forecasting data models prediction results and also provides the evaluation metrics. Once the forecasts and evaluation metrics are generated, they are pushed to the Data lake 105. The forecast component also outputs key recommendations which are pushed to Data lake 105.

Figure 1C:
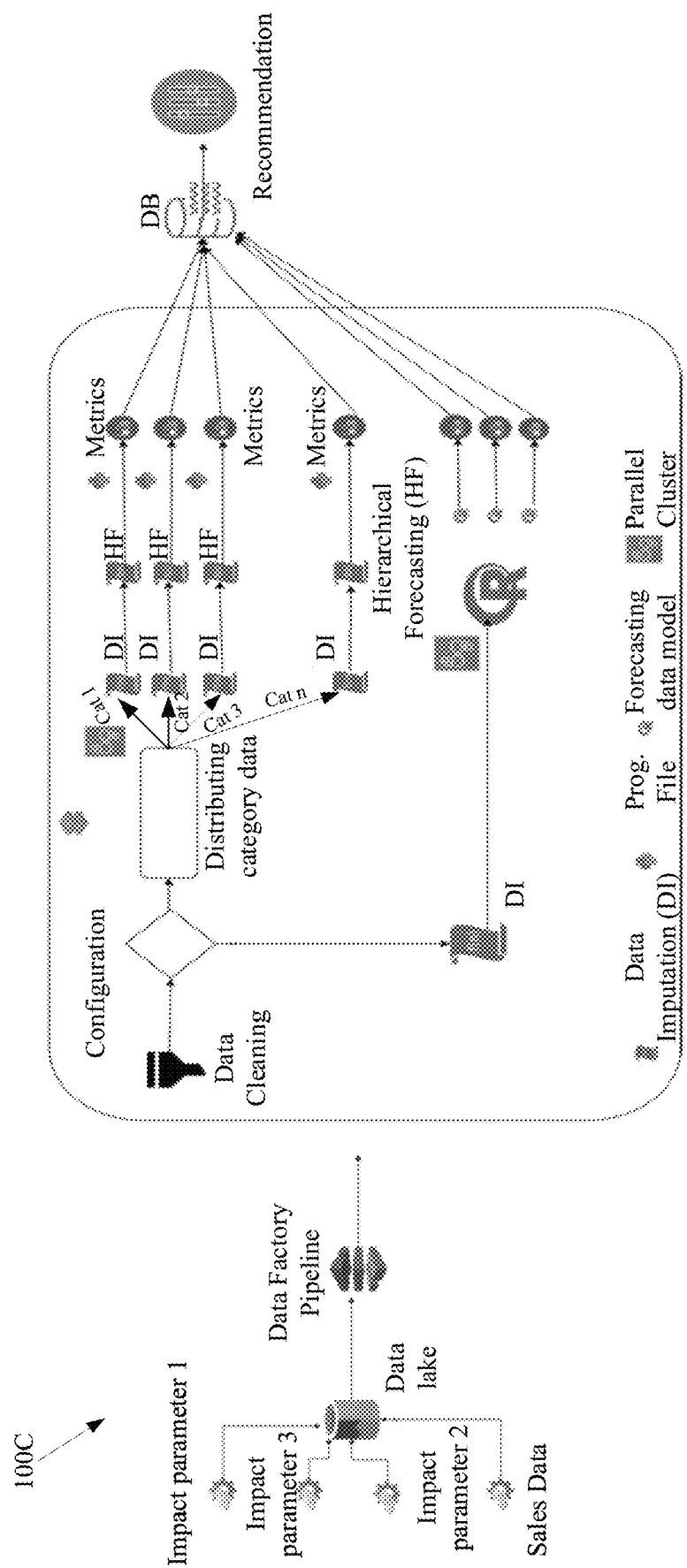
FIG. 1C is a system architecture flow diagram providing key recommendation in accordance with an embodiment of the invention.
Figure 1D:
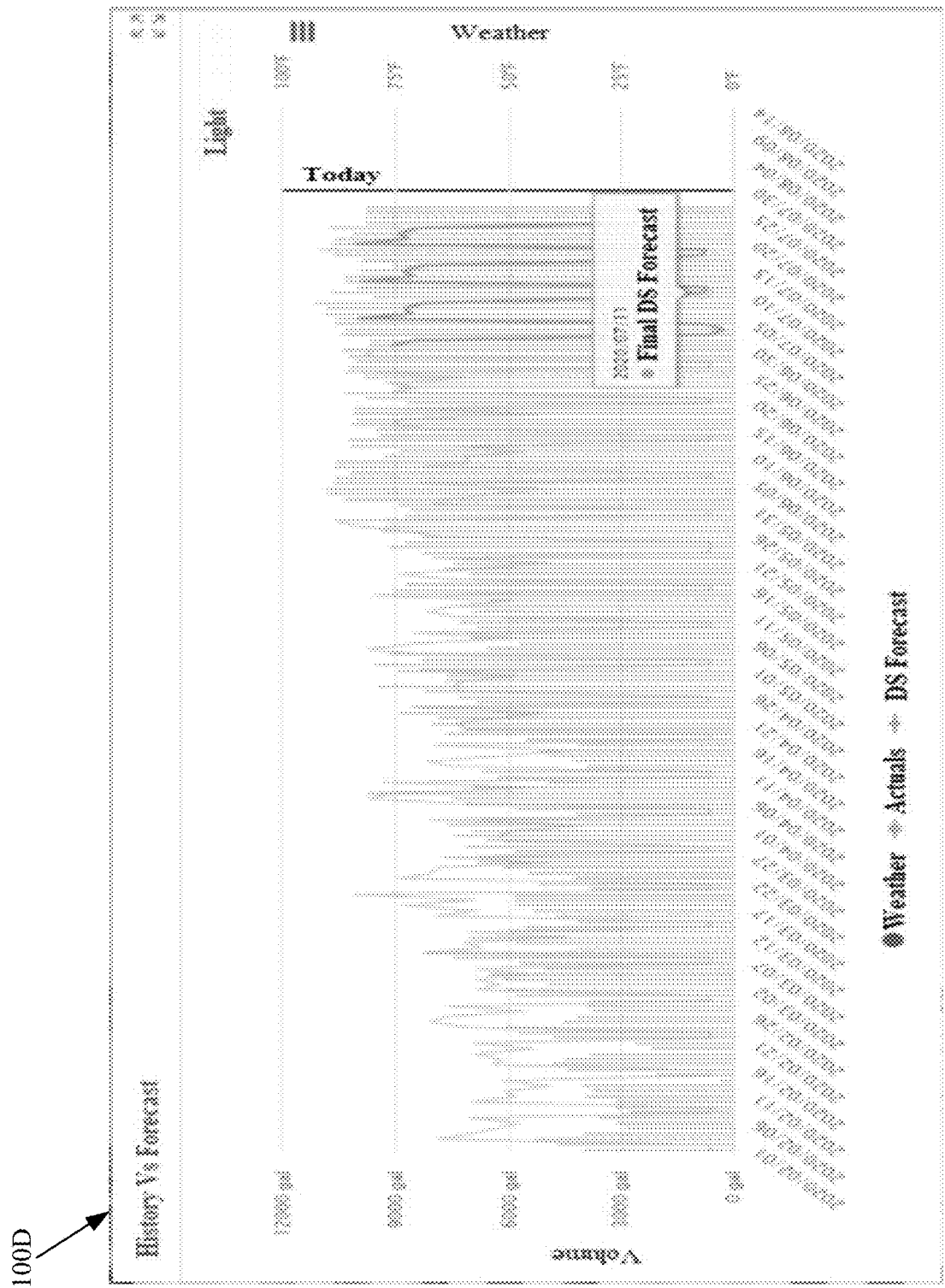
FIG. 1D is a closeup view of a user interface 101A in accordance with an embodiment of the invention.

Referring to FIG. 1C, a system architecture diagram 100C for key recommendation is provided in accordance with an embodiment of the invention. The key recommended parameters include best recommended frequency of forecast, most demand objects/items, discontinued objects/items, noisy items, preferred forecasting data model, impact parameters etc. The impact parameters are constraints that impact the demand prediction for the one or more objects. The parameters include weather, holiday information, performance of the objects, pandemics and political decisions.

In an exemplary embodiment, the system of the invention is configured to recommend a long-range or a short-range forecast frequency based on external variables where a backend data recommendation script created by a recommendation bot is configured to recommend the frequency. The frequency includes daily, monthly or yearly forecast. Further, the system is configured to recommend whether the external variables depend on the output (consumption value) or vice versa.

Referring to FIGS. 1, 1A, 1B and 1C, the support mechanism 104 further includes a controller 110 encoded with instructions, enabling the controller 108 to function as a bot for demand sensing and forecasting operations. The support mechanism 104 includes an AI engine 111 configured for enabling generation of one or more forecasting data models for processing of hierarchical data set to predict object data trend. The AI engine 111 analyzes processing results of the one or more forecasting data models at each level of the hierarchical data set to generate a prediction data model. The AI engine 111 is configured to transform the historical data set into a data matrix for training the one or more forecasting models on the historical data set. The mechanism 104 includes demand data categorization and classification engine 112 for cleansing and categorization of objects, a data solver and optimizer 113 for processing variables and optimization parameters. The data solver and optimizer 113 is configured for identifying constraint associated with sales of object before processing the historical datasets. The constraints act as impact parameters that may fluctuate demand of an object. The mechanism 104 includes a processor 114 coupled to the AI engine 111, the processor 114 is configured for performing various functions including but not limited to selecting appropriate forecasting data models, generating a hierarchical dataset from the received historical data where a bot creates a data script based on the received data for generating the hierarchical dataset by utilizing a library of functions, etc. The mechanism includes a data extraction and mapping module 115 configured for extracting and mapping object data to category by a clustering script generated through the AI engine 109. The mechanism 104 includes an API 116 for triggering the one or more forecasting data models through the processor 114 for carrying out the demand sensing and forecasting operation. Since demand sensing includes multiple functions within the sensing operation like data cleansing and enrichment, object/item categorization etc., the support mechanism 104 includes sub-processors 117 for carrying out multiple tasks simultaneously. Further, the demand sensing and forecasting leads to inventory management operation. The mechanism 104 includes a neural network as an auto encoder/decoder 118 coupled to the controller 110 and configured for identify one or more data attribute weights assigned to the prediction data model at each level of the hierarchical data set and processing the identified weights to determine an optimum data attribute weight for the prediction data model. The demand of the one or more objects is predicted based on the optimized prediction data model associated with the hierarchal data set.

In an embodiment, the mechanism 104 also includes an object specific forecasting data model mechanism (OSFDM)

as part of the forecasting data model database within an entity specific data in the data lake 105. The object includes item or service as part of supply chain.

In example embodiment the server 103 shall include electronic circuitry for enabling execution of various steps by the processor. The electronic circuitry has various elements including but not limited to a plurality of arithmetic logic units (ALU) and floating-point Units (FPU's). The ALU enables processing of binary integers to assist in formation of at least one table of data attributes where the forecasting data models implemented for object specific demand sensing are applied to the data table for obtaining forecasting data and recommending forecast parameters. In an example embodiment the server electronic circuitry includes at least one Athematic logic unit (ALU), floating point units (FPU), other processors, memory, storage devices, high-speed interfaces connected through buses for connecting to memory and high-speed expansion ports, and a low speed interface connecting to low speed bus and storage device. Each of the components of the electronic circuitry, are interconnected using various busses, and may be mounted on a common motherboard or in other manners as appropriate. The processor 114 can process instructions for execution within the server 103, including instructions stored in the memory or on the storage devices to display graphical information for a GUI on an external input/output device, such as display coupled to high speed interface. In other implementations, multiple processors and/or multiple busses may be used, as appropriate, along with multiple memories and types of memory. Also, multiple servers may be connected, with each server providing portions of the necessary operations (e.g., as a server bank, a group of blade servers, or a multi-processor system).

In an example embodiment, the system of the present invention includes a front-end web server communicatively coupled to at least one database server, where the front-end web server is configured to process the object data based on one or more forecasting data models by receiving from an ensemble of the one or more forecasting data models, a recommended forecast parameter processed by the server and applying an AI based dynamic processing logic to the recommended forecast parameter to automate task of demand sensing, forecasting and inventory management.

The processor 114 may be implemented as a chipset of chips that include separate and multiple analog and digital processors. The processor 114 may provide coordination of the other components, such as controlling user interfaces, applications run by devices, and wireless communication by devices.

The Processor 114 may communicate with a user through control interface and display interface coupled to a display. The display may be, for example, a TFT LCD (Thin-Film-Transistor Liquid Crystal Display) or an OLED (Organic Light Emitting Diode) display, or other appropriate display technology. The display interface may comprise appropriate circuitry for driving the display to present graphical and other information to an entity/user. The control interface may receive commands from a user/demand planner and convert them for submission to the processor. In addition, an external interface may be provided in communication with processor 114, so as to enable near area communication of device with other devices. External interface may provide, for example, for wired communication in some implementations, or for wireless communication in other implementations, and multiple interfaces may also be used.

In an embodiment, the present invention uses GPUs (Graphical processing units) for enabling AI engine 111 to provide computing power to processes humongous amount of data.

In an exemplary embodiment, the AI engine 111 employs machine learning techniques that learn patterns and generate insights from the data. Further, the AI engine 111 with ML employs deep learning that utilizes artificial neural networks to mimic biological neural network in human brains. The artificial neural networks analyze data to determine associations and provide meaning to unidentified data.

In another embodiment, the invention enables integration of Application Programming Interfaces (APIs) 116 for plugging aspects of AI into the demand sensing and forecasting application.

Referring to FIG. 1, the various elements like the support mechanism 104 and the data lake/memory data store 105 are shown as external connections to the server 103 in accordance with an embodiment of the invention. However, it shall be apparent to a person skilled in the art that these elements may be part to an integrated server system. Also, some of the sub-elements of the support mechanism 104 and the data lake/memory data store/data lake 105 either alone or in various combinations may be part of a server system as other external connections.

In an example embodiment, the data lake/memory data store 105 includes plurality of databases as shown in FIG. 1. The data store/data lake 105 includes a forecasting data model (FDM) database 119 storing one or more forecasting data models for predicting demand of one or more objects, a historical database 120 storing object related historical data from one or more entities, a functional database 121 configured for storing a library of functions enabling generation of a hierarchical data set from the historical data, a training dataset database 122 and a testing dataset database 123 for storing training data and testing data obtained at each level of the hierarchical data set. The forecasting data for the testing data set is generated using the training data set at each level through the forecasting data models. The data model database 119 includes an object specific data model (OSDM) database and a data script database (DSD) configured for storing a plurality of data script generated by the AI engine 111 based on analysis of the object data. The data script is generated based on prediction analysis, and deep learning performed on hierarchical data in historical database 119. The data lake 105 further includes a plurality of registers 124 as part of the memory data store/data lake 105 for temporarily storing data from various databases to enable transfer of data by a processor between the databases as per the instructions of the AI engine 111. The data lake 105 includes a graph database 125 configured for storing graphical data model where multiple criterion such as impact parameters, region of object sale can also be used as additional filters to recommend the best possible forecast parameters. The data lake 105 includes an impact parameter database 126 configured for storing impact parameters such as weather, other external variables, promotional data, etc., utilized for determining forecast of the object. The data lake 105 also stores object performance indicator (OPI) information about objects based on information in the historical database 120 related to past performance of objects such as spare parts of vehicles, etc., under certain environmental or geographical conditions. Depending on the nature of the object, the associated characteristics of the objects are also processed to determine appropriate forecast.

In an embodiment, the system retrieves forecast data based on a plurality of factors including revenue details, logistics, lead times, market fragmentation, capacity constraints, currency fluctuations and political risks.

In an embodiment, the one or more forecasting data models to process the hierarchical dataset for determining forecast data is determined based on data points including engagement and pricing models, analysis of historical policies and strategies, consumption patterns, behaviour and performance data, opportunities for consolidation of volumes across geographies, business units, product and service categories, volume tier discounts, new technologies, substitute products, low cost alternatives, standardization or reuse opportunities, currency hedging for materials which are predominantly imported, and inventory management practices.

The system further analyzes historical data through the application interface 101A and perform AI based predictions and demand aggregation by overlaying a historical consumption data with disparate forecasting models built on various data sources available to analyze consumption and pricing trends for the object.

The memory data store 105 may be a volatile, a non-volatile memory or memory may also be another form of computer-readable medium, such as a magnetic or optical disk.

The memory store 105 may also include storage device capable of providing mass storage. In one implementation, the storage device may be or contain a computer-readable medium, such as a floppy disk device, a hard disk device, an optical disk device, or a tape device, a flash memory or other similar solid-state memory device, or an array of devices, including devices in a storage area network or other configurations.

The computing devices referred to as the entity machine, server, processor etc. of the present invention are intended to represent various forms of digital computers, such as laptops, desktops, workstations, personal digital assistants, and other appropriate computers. Computing device of the present invention further intend to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this disclosure.

In an embodiment, the system is provided in a cloud or cloud-based computing environment. The demand sensing, forecasting and inventory management system enables more secured process considering the issues inherent with cloud environments.

In an embodiment, the entity or user includes a client, a demand planner, one or more operation of an Enterprise application automatically generating the demand sensing and forecasting request.

In an exemplary embodiment, the demand sensing, and forecasting system of the present invention is configured for analyzing impact of a plurality of varying parameters (changes in pricing, weather etc.,) on demand forecast. The varying parameters include market dynamics and internal drivers across object parts, products, commodities, and business units/plants across various Regions.

Figure 2:
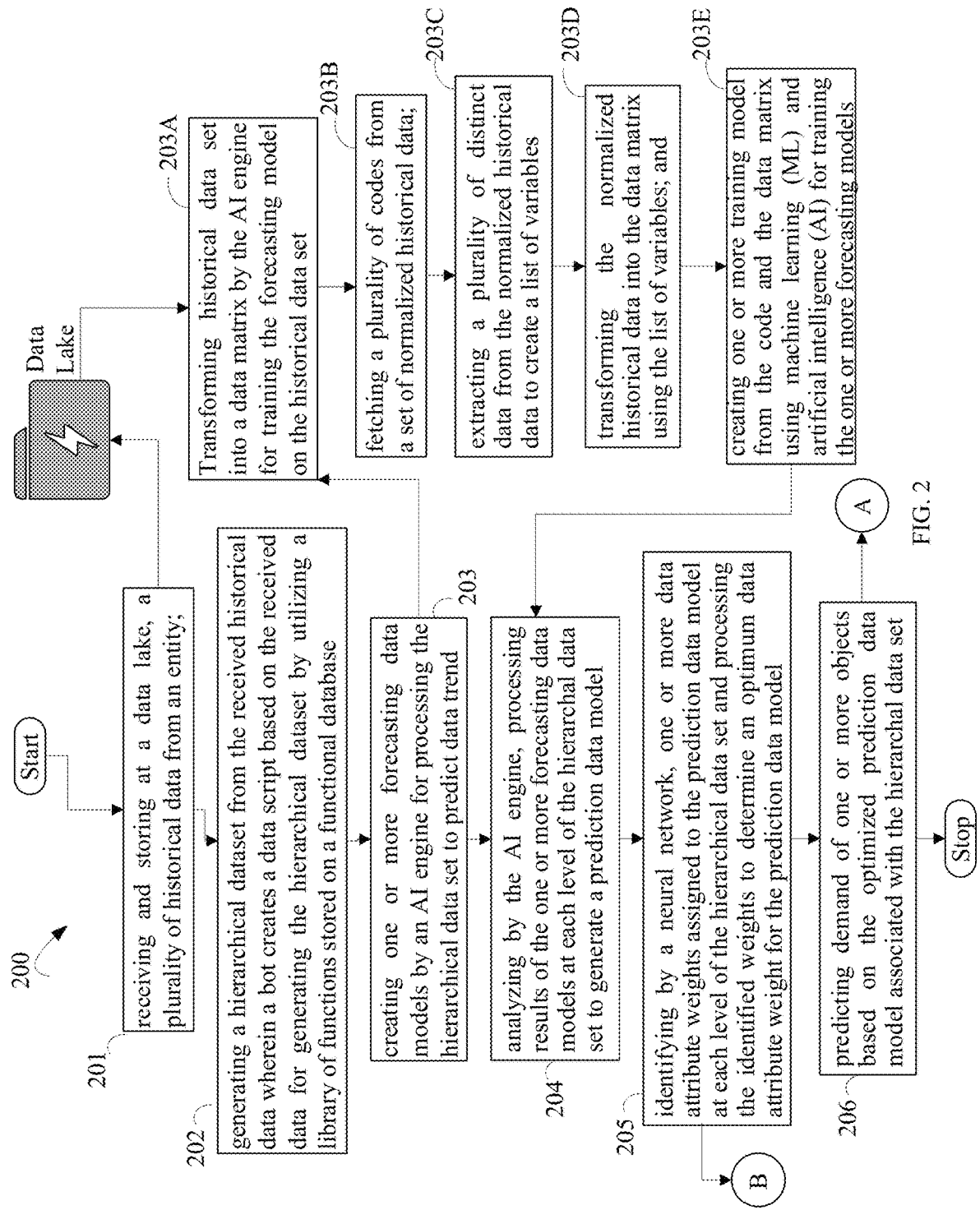
FIG. 2 is a flowchart depicting a method of demand sensing and forecasting in accordance with an embodiment of the invention.
Figure 2A:
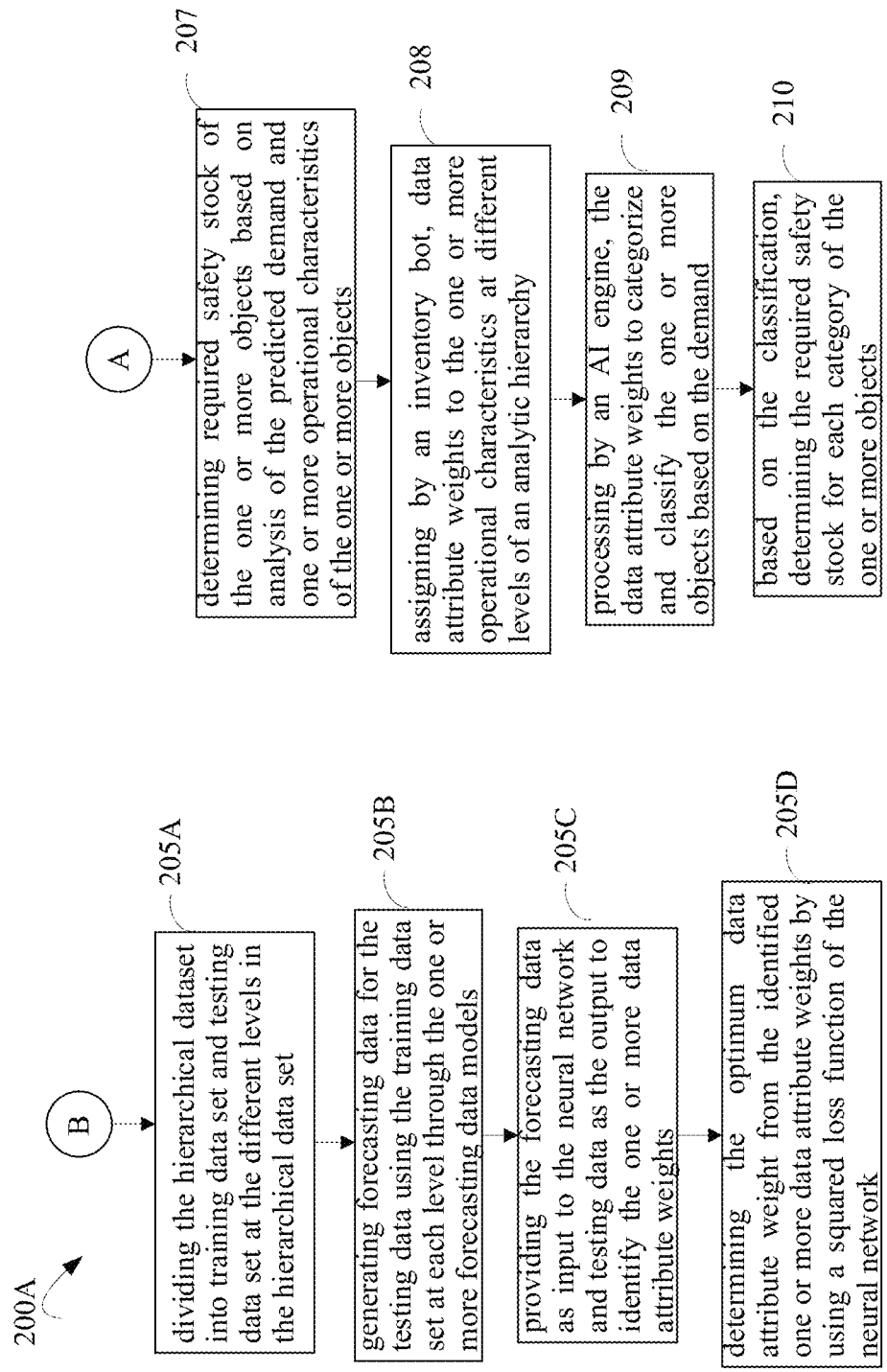
FIG. 2A is a flowchart depicting method of demand sensing and forecasting for inventory management operation in accordance with an embodiment of the invention.

Referring to FIG. 2 and FIG. 2A, flowchart (200, 200A) depicting a method of demand sensing and forecasting is provided in accordance with an embodiment of the present invention. The method includes the steps of 201 receiving and storing at a data lake, a plurality of historical data from an entity. In step 202 generating a hierarchical dataset from the received historical data wherein a bot creates a data script based on the received data for generating the hierarchical dataset by utilizing a library of functions stored on a functional database. In step 203 creating one or more forecasting data models by an AI engine for processing the hierarchical data set to predict data trend. In step 204 analyzing by the AI engine, processing results of the one or more forecasting data models at each level of the hierarchal data set to generate a prediction data model. In step 205 identifying by a neural network, one or more data attribute weights assigned to the prediction data model at each level of the hierarchical data set and processing the identified weights to determine an optimum data attribute weight for the prediction data model and in step 206 predicting demand of one or more objects based on the optimized prediction data model associated with the hierarchal data set.

In a related embodiment, the method of the invention includes execution of inventory management operation where in step 207 determining required safety stock of the one or more objects based on analysis of the predicted demand and one or more operational characteristics of the one or more objects. In step 208, assigning by an inventory bot, data attribute weights to the one or more operational characteristics at different levels of analytic hierarchy. In step 209, processing by an AI engine, the data attribute weights to categorize and classify the one or more objects based on the demand and in step 210 based on the classification, determining the required safety stock for each category of the one or more objects.

In another related embodiment the present invention trains the one or more forecasting data models. In step 203A the method transforms historical data set into a data matrix by the AI engine for training the forecasting model on the historical data set. In step 203B, the method fetches a plurality of codes from a set of normalized historical data. In step 203C, extracting a plurality of distinct data from the normalized historical data to create a list of variables. In step 203D, transforming the normalized historical data into the data matrix using the list of variables and in step 203E creating one or more training model from the code and the data matrix using machine learning (ML) and artificial intelligence (AI) for training the one or more forecasting models.

In yet another related embodiment, the method of the invention provides optimum data attributes through ensemble of one or more forecasting data models. The invention includes step 205A of dividing the hierarchical dataset into training data set and testing data set at the different levels in the hierarchical data set. In step 205B generating forecasting data for the testing data using the training data set at each level through the one or more forecasting data models. In step 205C providing the forecasting data as input to the neural network and testing data as the output to identify the one or more data attribute weights and in step 205D determining the optimum data attribute weight from the identified one or more data attribute weights by using a squared loss function of the neural network.

In an embodiment, the hierarchical data set is linear or non-linear time series data set distributed at different levels in a data hierarchy wherein the objects include raw materials or consumable products.

In an embodiment, the method of the invention computes forecasts for the one or more objects at different levels in the hierarchical dataset based on a hierarchical time series library with a fixed set of exogenous and hyper parameters wherein the exogeneous parameters are the constraints and the hyper parameters are parameters such as seasonality configured to finetune the forecasting models.

In an embodiment, the method includes categorizing the historical data to an object category wherein deduplication of historical data set is performed for appropriate categorization.

In an embodiment, the method includes creation of a plurality of backend performance data scripts by a performance bot based on an aggregate performance data pattern of the one or more objects and AI based processing logic to predict the demand of the one or more objects based on past performance. The AI based processing logic integrates deep learning, predictive analysis, information extraction, planning, scheduling, impact analysis and robotics for analysis of the aggregate performance data patterns to predict the demand.

Figure 3:
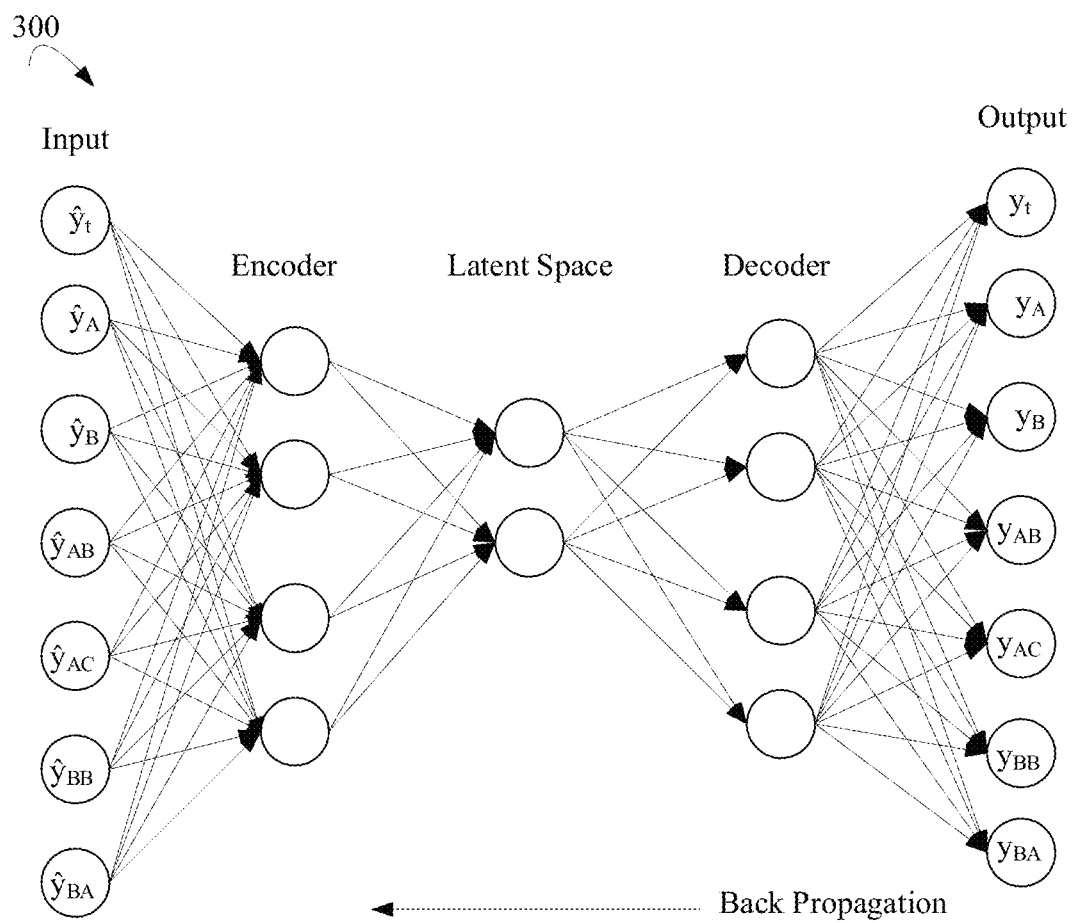
FIG. 3 is view of a neural network of the data processing system for demand sensing and forecasting in accordance with an embodiment of the invention.

Referring to FIG. 3, a neural network 300 of the data processing system is shown in accordance with an embodiment of the invention. The neural network 300 enables determination of data optimum attribute weights for the prediction data model. The system of the invention provides a variety of schemes for distributed learning of forecasting models, which learners leverage in every operation mode. Examples include large-scale machine learning approaches like learning an individual model per Hierarchy of product (example dark-bourbon-pack of 10 (items)) in an efficient parallel manner. This approach addresses the heterogeneity of the data (e.g., different item groups). For the schemes discussed, the optimization problems to solved for learning forecasting models on a collection of items includes generating the forecasts at each level in the hierarchy and by using optimization approaches like top-down and bottom-up obtain the optimized data attribute weights, which also solves for the cannibalization problem. i.e., sum of forecasts at the top level in the hierarchy should be sum of the bottom level forecasts. To elaborate more on the cannibalization problem of optimization, optimizer tries to learn a function which makes sure that all the top-level items all the sum of the bottom level items for the product hierarchy.

Figure 4:
FIG. 4 is a table depicting hierarchical dataset for a liquor dataset in accordance with an example embodiment of the invention.
Figure 4A:
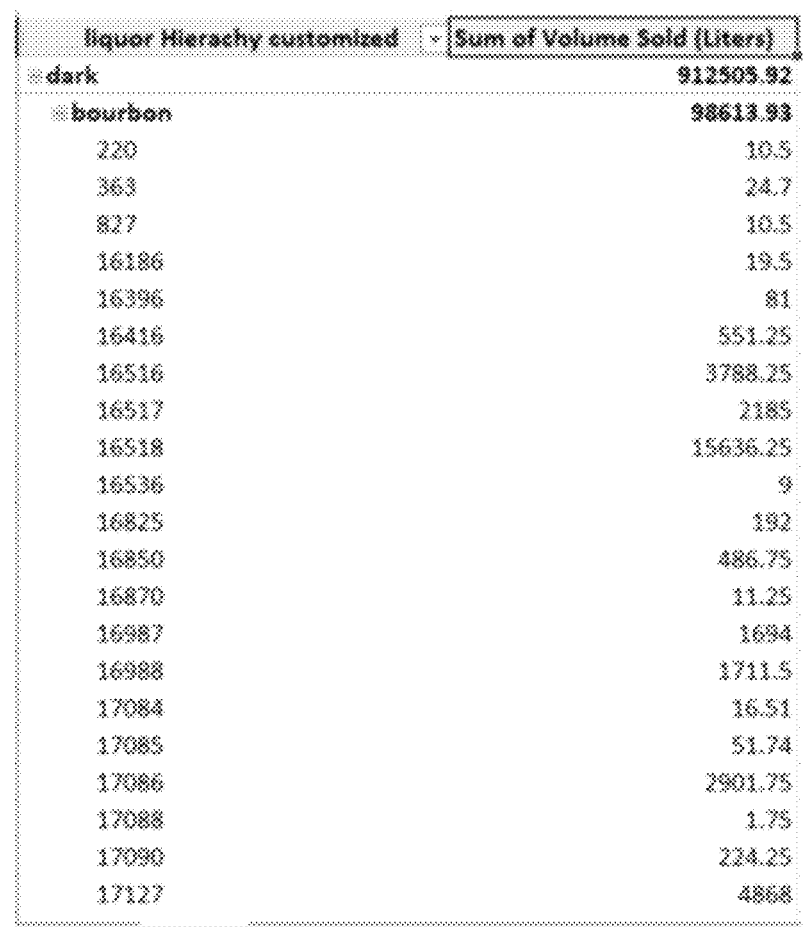
FIG. 4A is a table depicting hierarchy of dark bourbon liquor dataset in accordance with an example embodiment of the invention.
Figure 4B:
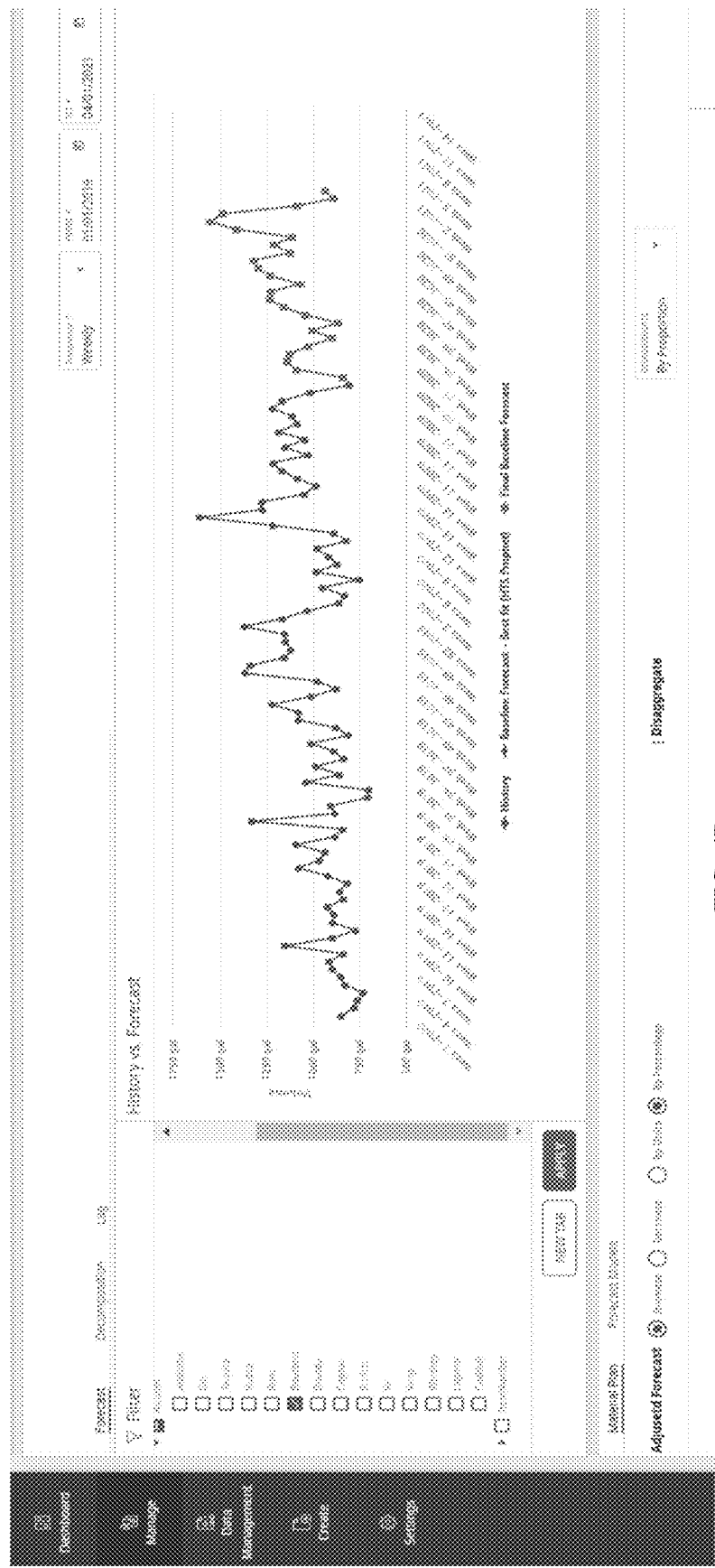
FIG. 4B is an application user interface showing long range forecast for an object in accordance with an embodiment of the invention.
Figure 4C:
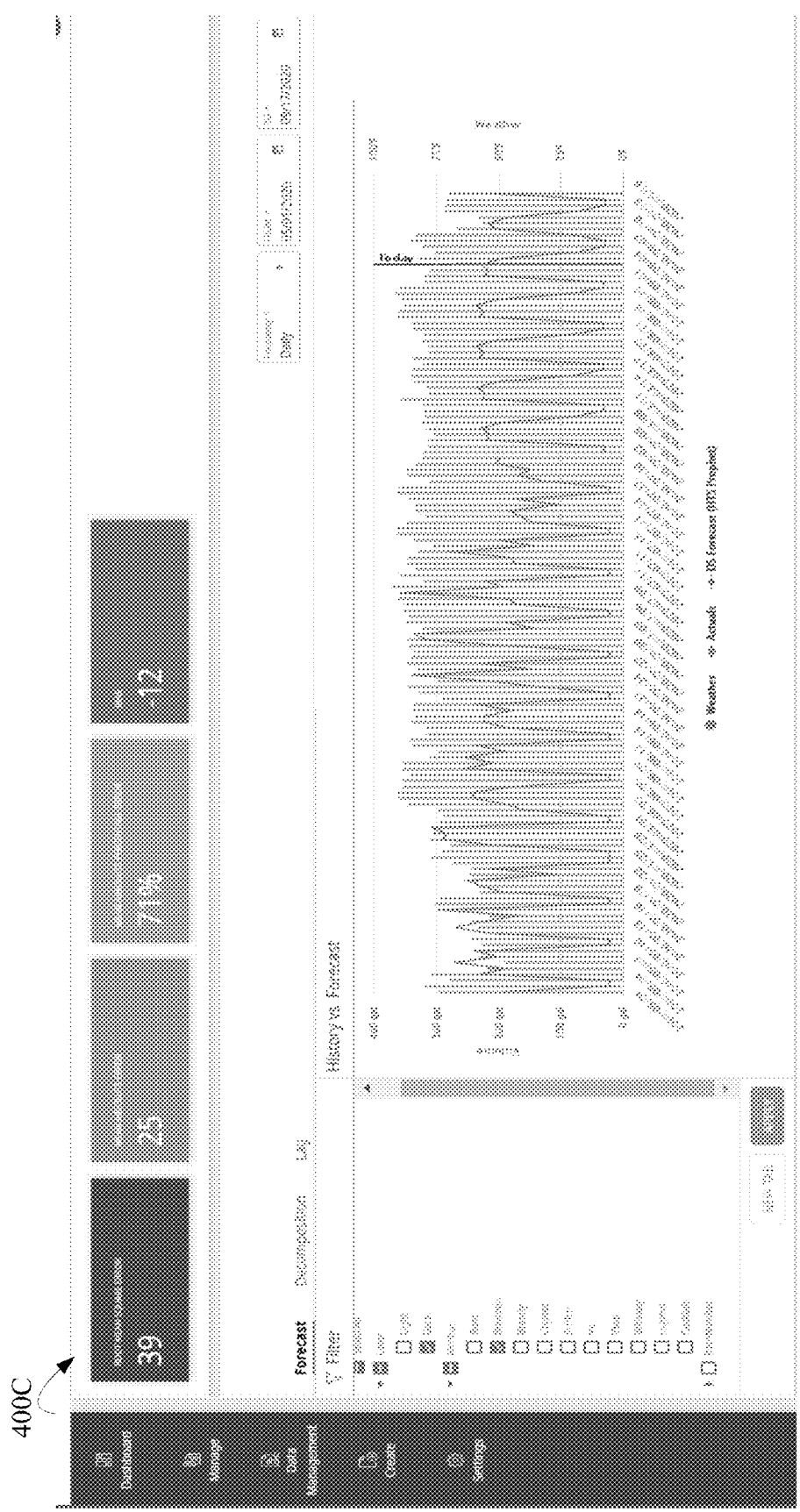
FIG. 4C is an application user interface showing short range forecast for an object in accordance with an embodiment of the invention.

Referring to FIG. 4 and FIG. 4A, data processing of a hierarchical dataset in table 400A and 400B related to liquor as object is provided in accordance with an example embodiment of the invention. Further, Referring to FIGS. 4B and 4C, a demand sensing, forecasting and inventory management application interface is shown in accordance with an embodiment of the invention. The interface application shows long range forecast interface 400B and short range forecast interface 400C for the object liquor.

Figure 4D:
FIG. 4D is an application user interface showing new object forecast in accordance with an embodiment of the invention.
Figure 4E:
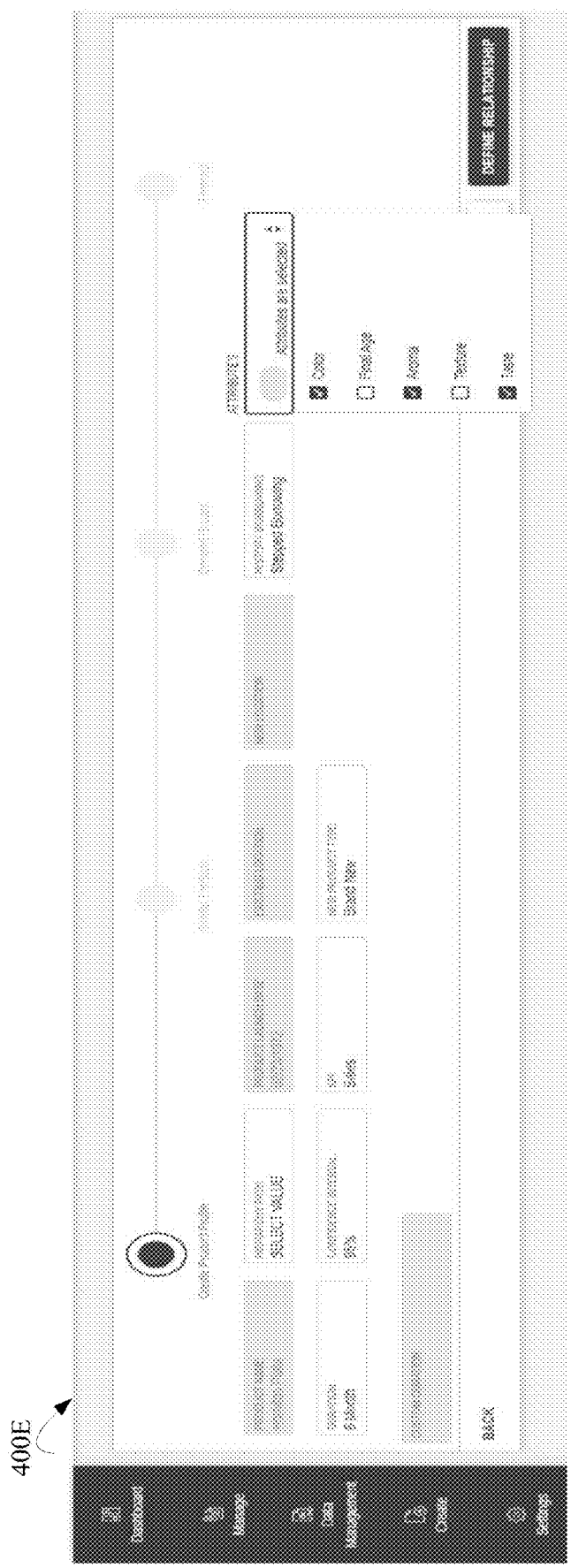
FIG. 4E is an application user interface showing selection of matching attributes and overlapping historical datasets in accordance with an embodiment of the invention.
Figure 4F:
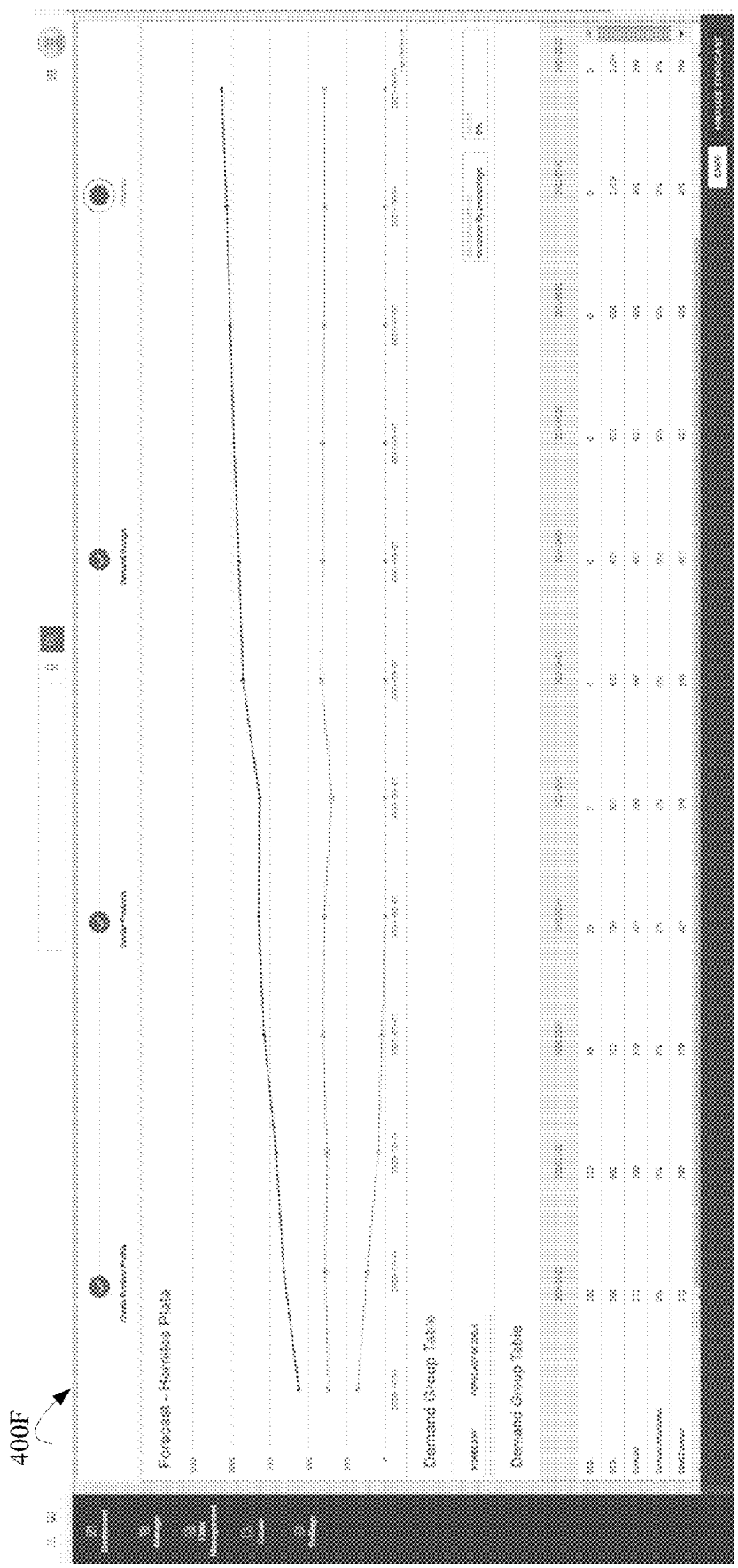
FIG. 4F is an application user interface with forecast preview as per a new object in accordance with an embodiment of the invention.

In an exemplary embodiment, the system of the invention enables a forecast data model generated based on one of the one or more objects to be implemented for forecasting demand related to other objects by the AI engine. In case of a new object, the application interface of the system is configured to overlay the learnings of the existing objects. Referring to FIGS. 4D, 4E and 4F, application interface 400D for new object forecast, application interface 400E for selecting matching attributes and overlapping historical datasets, and application interface 400F with forecast preview as per new object with existing forecasting data model is shown in accordance with an embodiment of the invention.

Figure 5:
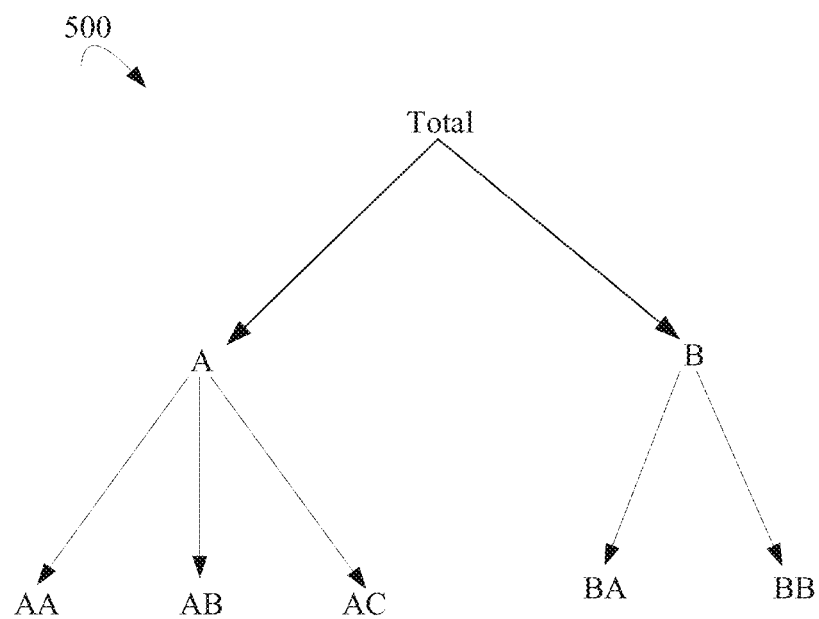
FIG. 5 is a hierarchical data set showing top-down hierarchy in accordance with an embodiment of the invention.

The system forecasts independently at all the levels by using an ensemble of forecasting data models including Prophet, Arima, exponential smoothing and random walks. The different nodes of the hierarchical dataset are as shown by top-down hierarchy diagram 500 in FIG. 5. The ensemble provides output of the forecasts at different levels in the hierarchy. These forecasts are considered as inputs to the neural network (FIG. 3) which acts as an auto encoder-decoder model. The output of the neural network is considered the actual forecasts and we get the optimal combination of data attribute weights. The forecast models after ensemble gives $\hat{y}$. The $\hat{y}$ acts as an input to the neural network (auto encoder decoder model) providing output y which will be compared against the (y actual values) using a back propagation technique and the data attribute weights which are obtained from this neural network model are the optimized data attribute weights.

In an exemplary embodiment, the neural network includes a LSTM layer embedded between auto encoder and decoder of the neural network for identifying temporal variations in testing data and determining data attribute weights considering the variations. In addition to using neural network model of auto-encoders or auto encoders with Long short term memory networks (LSTM) and Gated Recurrent Unit (GRU) in between encoder and decoder, the hierarchical dataset-based demand sensing and forecasting uses hierarchical forecast optimization techniques like top down, bottom up, and middle out approaches. Depending on the nature of object, the neural network (autoencoder model) or other approaches are utilized for forecasting. Considering forecasts at all the levels in the input i.e $$\hat{y} = \begin{bmatrix} \hat{y}t \\ \hat{y}AA \\ \hat{y}AB \\ \hat{y}AC \\ \hat{y}BA \\ \hat{y}B \\ \hat{y}A \end{bmatrix} \quad (1)$$

Output of the neural network (autoencoder) is compared with valid coherent forecasts.

$$y = \begin{bmatrix} t \\ AA \\ AB \\ AC \\ BA \\ B \\ A \end{bmatrix} \quad (2)$$

$$y = f(\hat{y})$$

Considering $\hat{y}t$ (forecasts as inputs), the neural network includes an auto encoder configured to compress the forecasting data by $$Z = \sigma(W\hat{y}+b) \quad (3)$$

Where Z is encoder Output.
Encoder takes the coherent forecasts and compresses it, which makes it efficient in dealing with large data hierarchy. The neural network includes a decoder configured to compare the compressed forecasting data with a valid coherent forecast data by $$y = \sigma'(W'Z+b') \quad (4)$$

where, the valid coherent forecast data is the testing data. Loss function obtained from the network is used to train the neural network through propagation procedure.

$$L(\hat{y},y) = |\hat{y}-y|^2 = |\hat{y}-\sigma'(W'(\sigma(W\hat{y}+b))+b')|^2 \quad (5)$$

The data attribute weights (which are coefficient of the above equations) are obtained from the loss function of the neural network.

Combining equation (3) & (4), we get $$y=\sigma'(W'(\sigma(W\hat{y}+b))+b') \quad (6)$$

where y is matrix of all data output values
$\hat{y}$ is the matrix of all the input values (predictions at all the levels)
b is bias term of encoder
b' is bias term of decoder
σ is a nonlinear activation function for the encoder
σ' is a non-linear activation function for the decoder
W is weights associated with the encoder
W' is weights associated with the decoder In an example embodiment, the demand sensing and forecasting system divides the data set into training data set (70 percent) and testing data set (30 percent) across all levels in a hierarchy. By ensemble of one or more forecasting data models (such as ARIMA, RW, ES, Prophet), using the training data set at each level the system forecasts for the testing data set (30 percent). The forecasts for the testing data set (30 percent) is input to the neural network model and the actual values of the testing data set (30 percent) is considered as output of the network. The loss function is squared loss by using this Neural Network Model such as (Boltzmann Machines, autoencoders). The system may also consider this 30 percent values which have temporal variation among them. So, an LSTM or RNN or GRU can also be used in between the auto encoder and decoder network (FIG. 3). Once this Neural network model is built with squared loss function after the end of training the data, the coefficients of that model are obtained. The coefficients are the data attribute weights of the hierarchy. The neural network model provides unbiased coherent forecasts.

In an exemplary embodiment the present invention employs high level data abstraction on top of big data tool that enables parallel and distributed computing. The dataflow abstraction enables easy creation or modification of a pipeline, which the system executes afterwards. During execution, the system can automatically apply inspections and optimizations. The abstraction enforces encapsulation and separation of concerns. The data flow abstraction models to different operating modes of the system.

Figure 6:
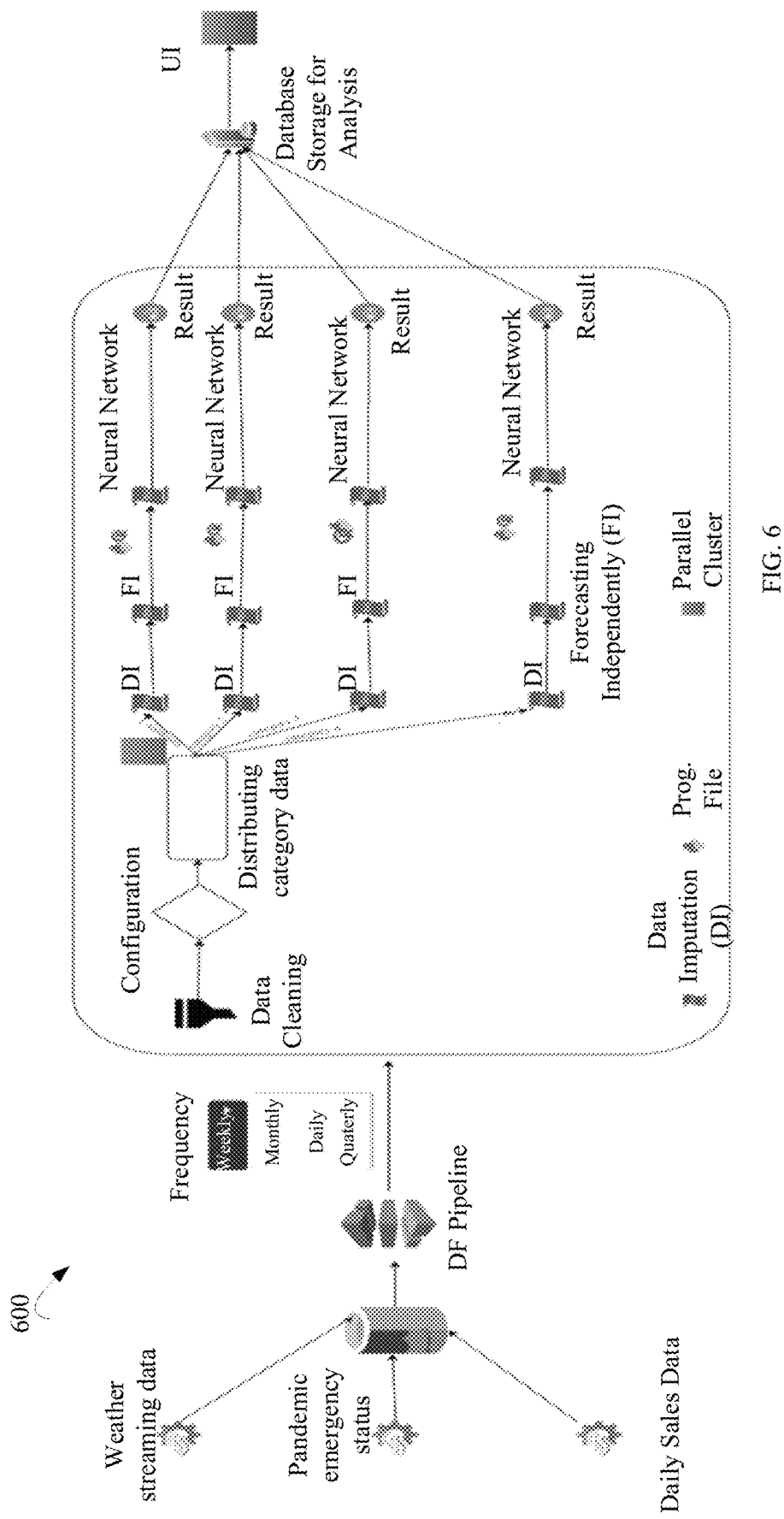
FIG. 6 is an architecture diagram of the one or more forecasting data model in accordance with an embodiment of the invention.

Referring to FIG. 6, an architecture diagram 600 of the one or more forecasting data model is provided in accordance with an embodiment of the invention. The data models forecast at different levels (aggregate or intermediate) of the hierarchy depending on the sparsity of the historical data for the object/product/location. Also, the system is configured to accommodate processing of hidden trends at lower level in the hierarchy even when forecast at higher level is accurate for that level. The system generates the forecast at the right level in the hierarchy using the one or more forecasting models so that maximum forecast accuracy is achieved, and minimum forecast error is incurred. The data models enable disaggregate (or aggregate) forecast so that it is available at the right level for consumption.

In an exemplary embodiment, in addition to using historical shipment and sales data, the data processing system of the invention gets the current market data, accounts for planned events, and incorporates any impact of external factors that may have correlation with demand. For example, incorporating the data around a pandemic. The demand for certain type of objects may be higher in a geographic region under the influence of the Pandemic, while certain other objects may see reduced demands. The system of the invention captures such real time changes in the external factors and accounts for the impact of these changes on the demand thereby enabling rest of the supply chain to be aligned for meeting the demand fluctuations.

Figure 7:
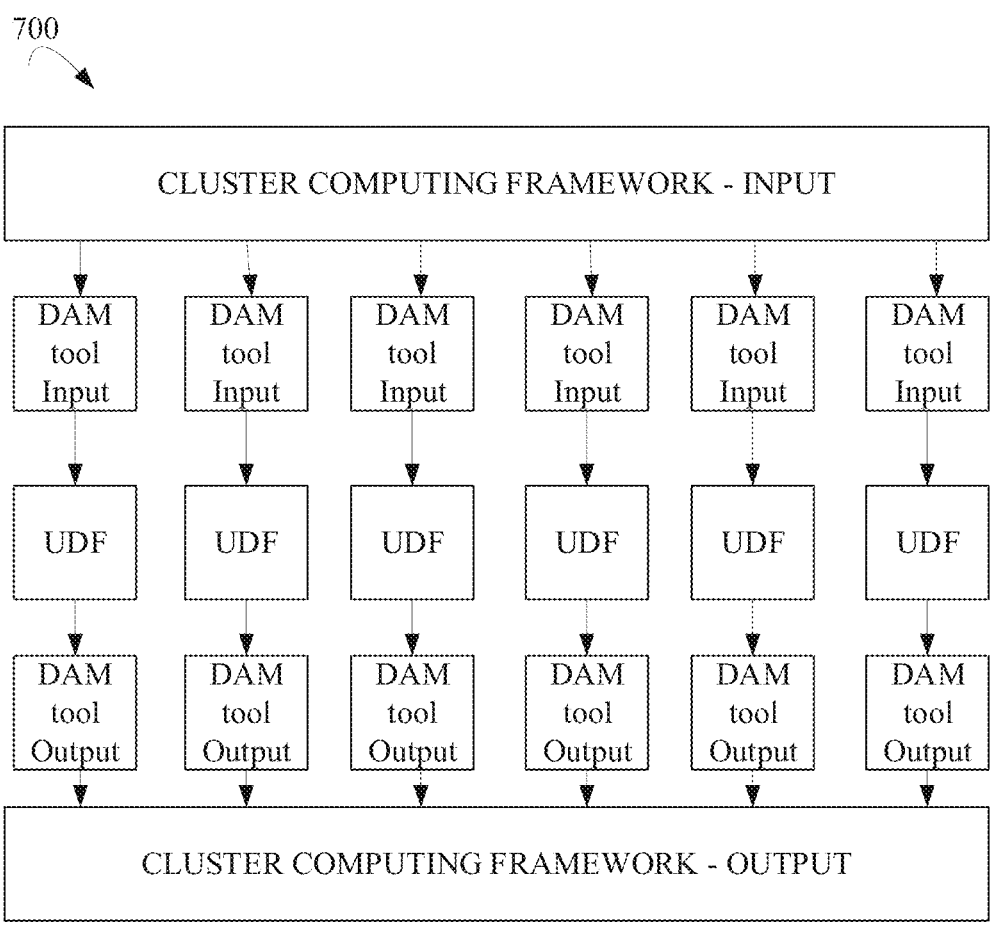
FIG. 7 a grouped map data flow layer architecture in accordance with an embodiment of the invention.

Referring to FIG. 7, a grouped map data flow layer architecture 700 is shown in accordance with an embodiment of the invention. The data processing system utilizes big data tool and cluster computing framework for parallel computing to perform pre-processing and generating forecast. The grouped map data flow layer includes a cluster computing framework input layer connected to a plurality of data acquisition and manipulation (DAM) tool input. The DAM tool inputs are provided to a user defined function (UDF) layer and a DAM output is obtained which is consumed at the cluster computing framework output layer. The UDF grouped mapping tool enables preprocessing, generates forecasts for each hierarchy and stores the forecast results in the Data lake. The system enables automated inspection and Optimization. Data factory pipeline (DF) includes processing logic that checks on the number of data points and provides an estimate on the amount of time it would take to generate forecasts at different levels of frequency. Based on the time the cluster size is chosen and forecasting data model parameters are chosen to optimize the code and render the forecasts within the estimated time frame.

In an advantageous aspect, the system of the present invention achieves a steady controlled increase in execution time with growing data and cluster size.

In an example embodiment, the system utilizes a fixed cluster size of 32 machines, a fixed set of 1 million items and vary the size of the feature matrices that are generated. In order to achieve this variation, the system generates feature matrices for different history lengths of 90, 180, 270 and finally 365 days. The linear running time increases but increasing the time dimension of the feature vectors has less impact on the runtime than increasing the number of items. This is because the time dimension of the feature vectors only affects the local learning steps. The dimensionality of the weight vectors is not impacted by that, therefore there is no reduction of the amount of distributed work that must be conducted. The system is configured to handle increasing historical datasets.

In an embodiment, the data abstraction enables distributed learning schemes that support separation of machine learning problems from actual learning process. The system codebase enables implementation of predefined interfaces for modelling the machine learning problem. The system is configured to compare a nested minimization error of different hierarchical optimization approaches (top-down, bottom-up) and also try both machine learning and time series-based approaches to determine the optimum approach.

In an example embodiment, for comparison of the approaches, the system runs hierarchical time series forecasting using any object sales data like say a liquor sales data and adding the impact parameters/exogeneous features like weather, holiday, promotional information etc. The forecasting is applied to say 1 million items each with about 2920 days of training data. The system runs this model on a cluster consisting of 8-core EC2 instances with 128 GB RAM each. Both the alternating and the nested minimization use 100 inner iterations for each outer iteration. It is observed that the nested approach using top-down approach is giving better result with ARIMA time series-based model.

In an exemplary embodiment, the data processing system enables parameter tuning for determining the most accurate forecasting models. The grouped mapping tool runs parameter tuning/search on different nodes of the big data tool cluster, which reduces the computation effort and time. The grouped mapping tool enables processing of one or more forecasting models in parallel, thereby performing optimization.

In an advantageous aspect, application of grouped map on hierarchical forecasting enables faster processing. Because the object/item/product hierarchy is independent at a topmost level, the system leverages this for dividing the data and running it on different nodes with the grouped map. By this optimization step with the grouped map tool, the system achieves efficient forecasts in a few hours at daily level and a few minutes at a weekly and monthly level for the data range of 220 million. Also, with the application of grouped map on the hierarchy data preprocessing of the data also happens with in a few minutes.

The present invention provides a demand sensing and forecasting system with a single codebase for scalable execution. The system supports accurate forecasting and extends to many different learners. The system enables task parallelism as well as intelligent materialization and reuse of intermediate results. Additionally, the system enables integration of deep neural network for more accurate data models.

In an exemplary embodiment, the data processing system and method includes execution of supply chain operations including demand planning, supply planning, and inventory management. The data processing system deploys a two-fold processing and analysis strategy. If the data processing system assess that a demand for an object is about to fluctuate during certain period of time, the system also analyzes supply, inventory of the raw material required to manufacture/produce that object. For Eg., a demand fluctuation of a pharmaceutical product/medicine manufactured with multiple ingredients would also impact the inventory and stock of both the related ingredients and the product itself. This assessment requires the AI engine of the system to generate accommodate for both the product as well as the raw material supply chain requirements. The data processing system of the present invention is configured to assess the ingredients/sub-components/raw material of the end-product based on the demand sensing and forecast data of the end product itself. Further, the one or more forecasting data models generated by the AI engine for demand sensing and forecasting of the end-product may be implemented for assessing stock requirement, demand for the raw material as well. i.e the learnings of the data patterns for an object may be applied for assessing the raw materials required to manufacture the object.

In another embodiment, the AI engine coupled to the controller encoded with instructions enabling the controller to function as a bot generates sub-learning forecasting data models from the one or more forecasting data models for assessing demand of the sub-components of the objects.

In an embodiment, depending on the nature of the object for demand sensing and forecasting, the parameters to be processed also varies. For e.g.; in case of objects as spare parts, the factors such as reliability of the object based on performance in different conditions may also have to be considered in forecasting a demand. Such parameters are also analyzed to ensure appropriate inventory management.

Figure 8:
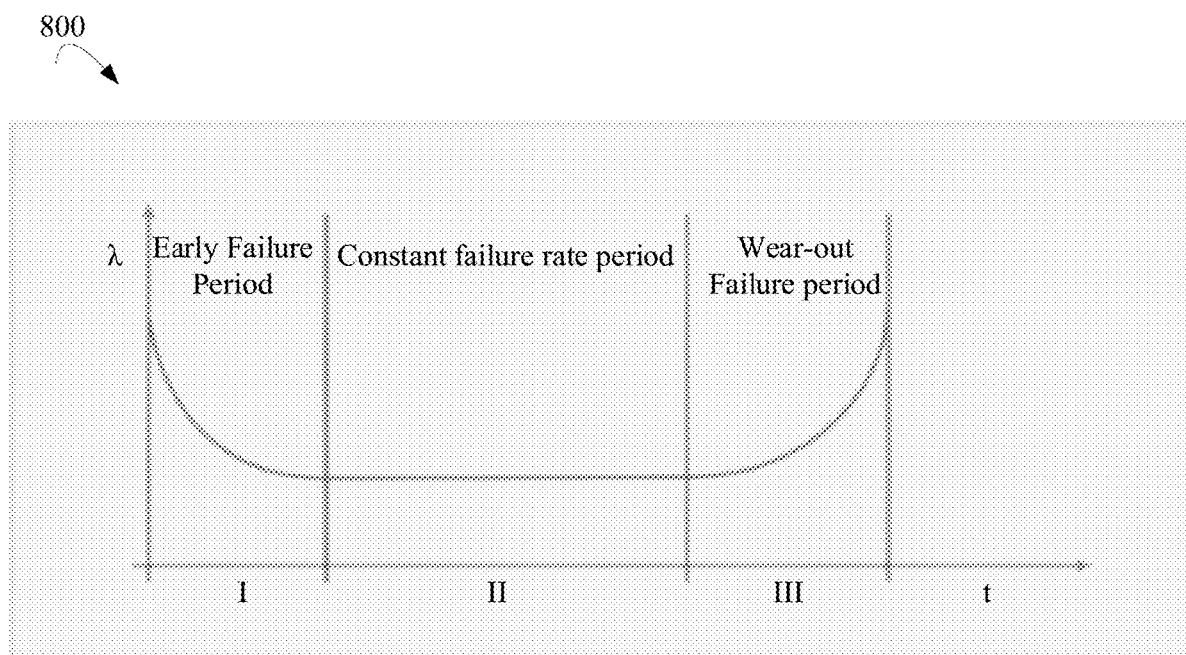
FIG. 8 is a graph depicting a bathtub curve in accordance with an embodiment of the invention.

The reliability of an object is determined by analyzing the lifetime of a population of object/item/products using a graphical bathtub curve. Referring to FIG. 8, a graph 800 depicting a bathtub curve is shown in accordance with an embodiment of the invention. The bathtub curve consists of three periods: an infant mortality period with a decreasing failure rate, followed by a normal life period (also known as "useful life") with a low, relatively constant failure rate, and concluding with a wear-out period that exhibits an increasing failure rate of the object. The bathtub curve does not depict the failure rate of a single item but describes the relative failure rate of an entire population of object/item/products over time. As seen in FIG. 8, Zone I, is the infant mortality period and is characterized by an initially high failure rate. This is usually attributed to poor design, substandard components and/or inadequate controls in the manufacturing process. Generally, a piece of equipment is released for actual use only after it has successfully passed the "burn in" period. A 48-hour "burn in" is usually adequate to significantly reduce infant mortality failures, and so it's good practice to include the "burn in" run as part of the contract with manufacturers. Zone II, the useful life period, is essentially characterized by a failure rate that is constant and resulting from strictly random or "chance" causes. These "chance" failures occur when the stress levels on the equipment/part during operations exceed the maximum threshold due to random, unforeseen or unknown events. While reliability relates to all three types of failures, its primary area of focus relates to chance failures because these occur during the useful life period of the equipment. Although these failures occur at a constant average rate, the number of events occurring in any time interval is independent of the number of events occurring in any other time interval and are closely associated with exponential distribution. Zone III, the wear-out period, is characterized by an increasing failure rate attributable to equipment deterioration caused by age or usage. The only way to prevent these failures is to replace or repair the deteriorating component before it fails. While Zone I failures can be avoided and Zone III failures are experienced in equipment at the outer limits of its usable life period, the Zone II where the failure occurs during the useful life period of the equipment needs to be analyzed as additional parameter. Data pertaining to the mean time between failures (MTBF), total number of units being operated at a location, and the lead time of the component is collated and assessed mathematically to derive the expected number of failures. Using this, the number of spare parts required at different service level is calculated for demand sensing, forecasting and inventory management.

Figure 8A:
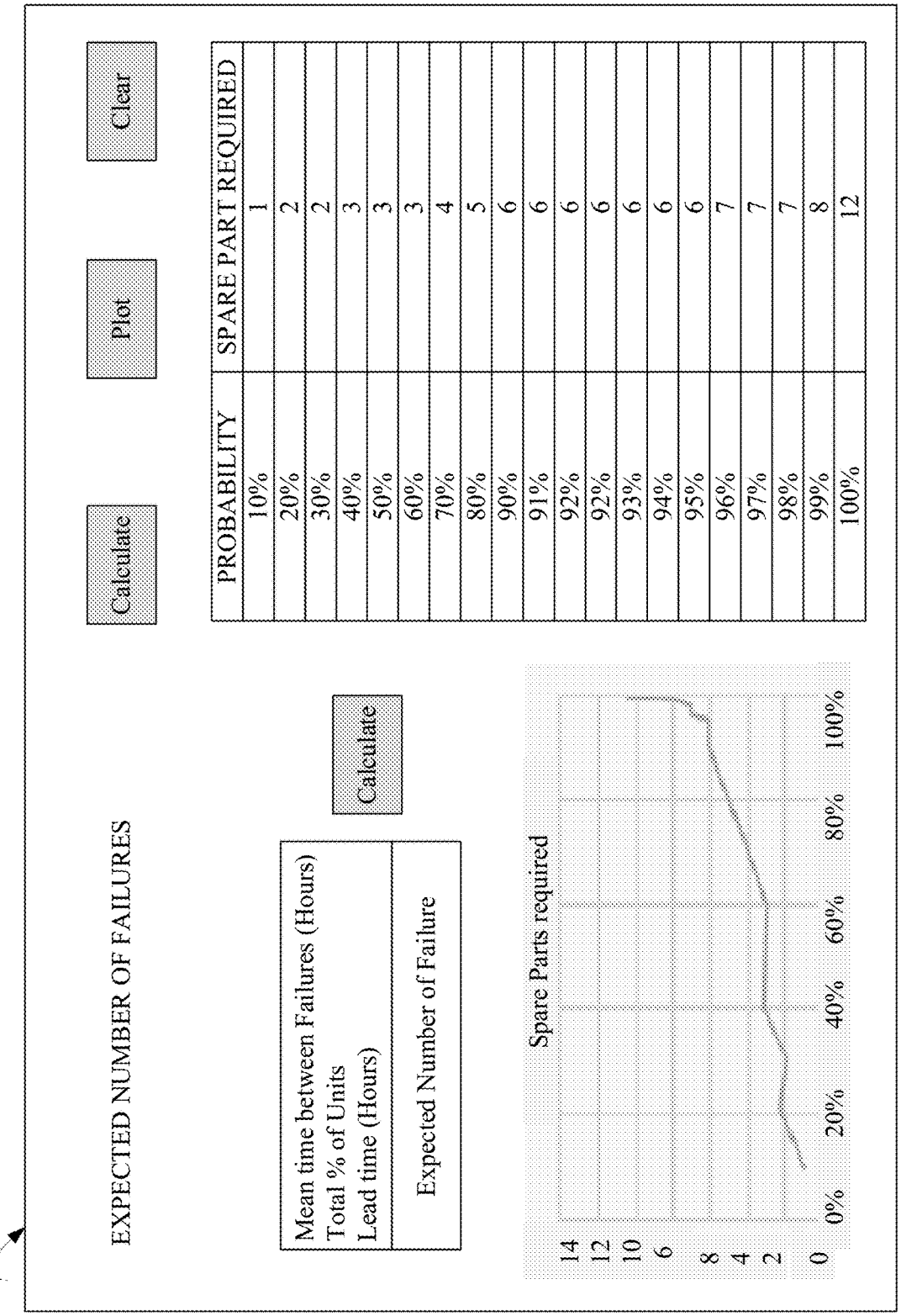
FIG. 8A is a graph on application interface of an object inventory management tool in accordance with an embodiment of the invention.

Referring to FIG. 8A, a graph 800A shown on application interface of an object/spare inventory management tool is provided in accordance with an embodiment of the invention. The execution of inventory management operation includes determining required safety stock of the one or more objects based on analysis of the predicted demand and one or more operational characteristics of the one or more objects, assigning by an inventory bot, data attribute weights to the one or more operational characteristics at different levels of analytic hierarchy, processing by an AI engine, the data attribute weights to categorize and classify the one or more objects based on the demand and based on the classification, determining the required safety stock for each category of the one or more objects.

In an embodiment, the one or more operational characteristics include functionality, response time, lead time, category of object, demand, lifecycle, and pricing. Functionality is effect of the component failure on the system's availability. Response time is duration between call logged to restoration of component's functionality as agreed in the contract. Lead time is duration between placing the order and the delivery. Category/Nature of the object is Commodity/OEM/Fabricated. Lifecycle is which of these phases—introduction, established to be continued, or phase-out.

In an embodiment, the category includes low consumption, medium consumption and high consumption objects. The safety stock for medium consumption is determined based on mean and variance as:
if mean×1.1>Variance, then the safety stock is determined by Poisson distribution else
if mean×1.1<Variance, then the safety stock is determined by bootstrapping methodology.

In an embodiment, the safety stock for high consumption is determined as:

$$S = Z\alpha \times \sqrt{E(L)\sigma^2 D + (E(D))^2 \sigma^2 L}$$

where, $\alpha$ is service level and $Z_\alpha$ is the inverse distribution function of a standard normal distribution with cumulative probability $\alpha$ of the one or more object;
$E(L)$ and $\sigma_L$ are standard deviation of lead time; and
$E(D)$ and $\sigma_D$ are standard deviation of demand in each unit time period.

In an embodiment, data processing for the inventory management includes identifying excess inventory of the one or more objects based on the safety stock and managing the inventory by supplier buy back mechanism, vendor managed inventory mechanism, inter facility transfer mechanism, and resale or disposal mechanism.

In an exemplary embodiment, the present invention collates and scrubs data from one or more internal and external databases including ERPs, Vendor Management Systems, Newsfeeds from top Industry Sources, historical data, and inventory management systems for data analysis to predict demand.

In an example embodiment, the system of the invention analyzes demand data patterns of an entity object through classification of the historical data into a hierarchical taxonomy that provides insights into the consumption patterns. The AI engine of the invention generates clusters from historical data and processes the data through an unsupervised and nonparametric clustering approach as the number of possible clusters are unknown. The consumption data is obtained from several data sources. Each data sample has several attributes obtained from different sources. The consumption data at multiple levels of the hierarchy is consolidated into a unified hierarchical taxonomy.

In one embodiment the system is configured to generate a set of quantitative and qualitative data on the dashboard of the interface to analyze object related demand trends in supply chain. The quantitative data includes demand forecasts, and the qualitative data includes newsfeeds, other impact parameters such as weather etc.

In an exemplary embodiment, the application user interface may enable cognitive computing to improve interaction between a user and the supply chain application(s). The intelligent interface provides insight into dynamically changing parameters such as key information obtained from live newsfeeds. The AI engine processes the newsfeed to draw relevance from the content and provide actionable insight to a user. Alternately, the system is configured to assign weights to type of news feeds and impact of certain news on demand of objects to auto rate the scenario and provide recommended forecast parameter. Further, in an advantageous aspect, the cognitive aspect of the invention enables a demand planner to override an auto assessment by the AI engine if required.

In another exemplary embodiment, the present invention may be a system, a method, and/or a computer program product. The computer program product may include a computer readable storage medium (or media) having computer readable program instructions thereon for causing a processor to carry out aspects of the present invention. The media has embodied therein, for instance, computer readable program code (instructions) to provide and facilitate the capabilities of the present disclosure. The article of manufacture (computer program product) can be included as a part of a computer system/computing device or as a separate product.

The computer readable storage medium can retain and store instructions for use by an instruction execution device i.e. it can be a tangible device. The computer readable storage medium may be, for example, but is not limited to, an electromagnetic storage device, an electronic storage device, an optical storage device, a semiconductor storage device, a magnetic storage device, or any suitable combination of the foregoing. A non-exhaustive list of more specific examples of the computer readable storage medium includes the following: a hard disk, a random access memory (RAM), a portable computer diskette, a read-only memory (ROM), a portable compact disc read-only memory (CD-ROM), an erasable programmable read-only memory (EPROM or Flash memory), a digital versatile disk (DVD), a static random access memory (SRAM), a floppy disk, a memory stick, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the internet, a local area network (LAN), a wide area network (WAN) and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that which falls within the scope of the appended claims.

The invention claimed is:

1. A data processing method for demand sensing and forecasting, the method comprises
receiving and storing at a data lake, a plurality of historical data from an entity;
generating a hierarchical dataset from the received historical data wherein a bot creates a data script based on the received data for generating the hierarchical dataset by utilizing a library of functions stored on a functional database, wherein the hierarchical data set is a linear or non-linear time series data set distributed at different levels in a data hierarchy wherein "the hierarchical dataset includes data processed with hidden trends at lower level in the data hierarchy;

creating one or more forecasting data models by an AI engine for processing the hierarchical data set to predict data trend, wherein the AI engine is configured to transform the historical data set into a data matrix for training the one or more forecasting models on the historical data set;

analyzing by the AI engine, processing results of the one or more forecasting data models at each level of the hierarchal data set to generate a prediction data model;

identifying by a neural network, one or more data attribute weights assigned to the prediction data model at each level of the hierarchical data set and processing the identified weights to determine an optimum data attribute weight for the prediction data model, wherein the neural network includes an auto encoder and decoder configured for data compression wherein a LSTM (long short term memory networks) layer is embedded between the auto encoder and decoder of the neural network for identifying temporal variations in a testing data and determining the data attribute weights considering the variations;

dividing the hierarchical dataset into training data set and testing data set at the different levels in the hierarchical dataset;

generating forecasting data for the testing data using the training data set at each level through the one or more forecasting data models; and predicting demand of one or more objects based on the optimized prediction data model associated with the hierarchal data set, wherein the auto encoder is configured to compress the forecasting data and the decoder is configured to compare the compressed forecasting data with a valid coherent forecast data; and executing supply chain operations including inventory management, wherein executing the supply chain operations including inventory management includes determining a required safety stock of the one or more objects based on analysis of the predicted determining a required more operational characteristics of the one or more objects, wherein the one or more operational characteristics includes category of object, wherein the category of object includes high consumption objects, and wherein the safety stock for high consumption is determined. as:

$$S=Z\alpha \times \sqrt{(E(L)\sigma^2 D+(E(D))^2\sigma^2 L)}$$

where, $\alpha$ is service level and $Z\alpha$ is the inverse distribution function of a standard normal distribution with cumulative probability $\alpha$ of the one or more object;

E(L) and $\sigma L$ are standard deviation of lead time; and

E(D) and $\sigma D$ are standard deviation of demand in each unit time period.

2. The method of claim 1, wherein the objects include raw materials or consumable products.

3. The method of claim 2 wherein the one or more forecasting models include a Stochastic time series data model, time series univariate forecasting data model with error, trend and seasonal model, and random walk data model.

4. The method of claim 1 further comprises training the one or more forecasting models by fetching a plurality of codes from a set of normalized historical data;

extracting a plurality of distinct data from the normalized historical data to create a list of variables;

transforming the normalized historical data into the data matrix using the list of variables; and creating one or more training model from the code and the data matrix using machine learning (ML) and artificial intelligence (AI) for training the one or more forecasting models.

5. The method of claim 4 further comprises recommending a long-range or a short-range forecast frequency based on external variables wherein a backend data recommendation script created by a recommendation bot is configured to recommend the frequency.

6. The method of claim 1 further comprises the step of:

processing a plurality of distributed learning scheme to integrate and scale large class of one or more learning data scripts to create the one or more forecasting data models.

7. The method of claim 1 further comprises:

one or more constraints impacting the demand prediction for the one or more objects wherein the constraints include impact parameters such as weather, holiday information, performance of the objects, pandemics and political decisions.

8. The method of claim 6 further comprises:

computing forecasts for the one or more objects at different levels in the hierarchical dataset based on a hierarchical time series library with a fixed set of exogenous and hyper parameters wherein the exogeneous parameters are the constraints and the hyper parameters are parameters such as seasonality configured to finetune the forecasting models.

9. The method of claim 8 further comprises the steps of:

providing the forecasting data as input to the neural network and testing data as the output to identify the one or more data attribute weights; and determining the optimum data attribute weight from the identified one or more data attribute weights by using a squared loss function of the neural network.

10. The method of claim 9 wherein the data attribute weights are determined by:

$$y=\sigma'(W'(\sigma(W\hat{y}+b))+b')$$

where y is matrix of all data output values $\hat{y}$ is the matrix of all the input values (predictions at all the levels)

b is bias term of encoder b' is bias term of decoder $\sigma$ is a nonlinear activation function for the encoder $\sigma'$ is a non-linear activation function for the decoder W is weights associated with the encoder W' is weights associated with the decoder.

11. The method of claim 10 wherein the auto encoder is configured to compress the forecasting data by $$Z=\sigma(W\hat{y}+b)$$

Where Z is encoder Output.

12. The method of claim 11 wherein the decoder is configured to compare the compressed forecasting data with the valid coherent forecast data by $$y=\sigma'(W'Z+b')$$

wherein the valid coherent forecast data is the testing data.

13. The method of claim 12 wherein the squared loss function (L) of the neural network is $$L(\hat{y}, y)=|\hat{y}-y|^2=|\hat{y}-\sigma'(W'(\sigma(W\hat{y}+b))+b')|^2.$$

14. The method of claim 1 further comprises
categorizing the historical data to an object category wherein deduplication of historical data set is performed for appropriate categorization.

15. The method of claim 1 further comprises computing error metrics persist in the data lake in specified conformed zones/location, populating a respective SQL database tables from the data script, computed forecast and metrics wherein the SQL database tables are consumed further at a consumption layer.

16. The method of claim 15 wherein the data lake fetches data from several data sources, cleans and combines the cleansed data to produce the historical dataset comprised of item features and historical demand data.

17. The method of claim 7 further comprises a plurality of backend performance data scripts created by a performance bot based on an aggregate performance data pattern of the one or more objects and AI based processing logic to predict the demand of the one or more objects based on past performance.

18. The method of claim 17 wherein the AI based processing logic integrates deep learning, predictive analysis, information extraction, planning, scheduling, impact analysis and robotics for analysis of the aggregate performance data patterns to predict the demand.

19. The method of claim 1 further comprises execution of supply chain operations including demand planning and supply planning.

20. The method of claim 19 wherein execution of inventory management operation further includes the steps of:
assigning by an inventory bot, data attribute weights to the one or more operational characteristics at different levels of analytic hierarchy;
processing by an AI engine, the data attribute weights to categorize and classify the one or more objects based on the demand; and
based on the classification, determining the required safety stock for each category of the one or more objects.

21. The method of claim 20 further comprises:
estimating a required sub-stock of one or more components of the object based on predicted demand of the object wherein the AI engine is configured to assess a demand data pattern of the components based on the predicted demand of the object by the one or more forecasting data models.

22. The method of claim 21 wherein the one or more operational characteristics further includes functionality, response time, lead time, demand, lifecycle, and pricing.

23. The method of claim 22 wherein the category further includes low consumption and, medium consumption objects.

24. The method of claim 23 wherein the safety stock for medium consumption is determined based on mean and variance as:
if mean×1.1>Variance, then the safety stock is determined by Poisson distribution else
if mean×1.1<Variance, then the safety stock is determined by bootstrapping methodology.

25. The method of claim 1 further comprises:
identifying excess inventory of the one or more objects or one or more components of the objects based on the safety stock and managing the inventory by supplier buy back mechanism, vendor managed inventory mechanism, inter facility transfer mechanism, and resale or disposal mechanism.

26. A data processing system for demand sensing and forecasting comprises:
a server configured to receive a plurality of historical data from an entity and storing the data at a data lake;
a processor for generating a hierarchical dataset from the received historical data wherein a bot creates a data script based on the received data for generating the hierarchical dataset by utilizing a library of functions stored on a functional database, wherein the hierarchical data set is a linear or non-linear time series data set distributed at different levels in a data hierarchy;
an AI engine coupled to the processor and configured for creating one or more forecasting data models based on the hierarchical data set for predicting demand of one or more objects wherein the AI engine analyzes processing results of the one or more forecasting data models at each level of the hierarchal data set to generate a prediction data model and wherein the AI engine is configured to transform the historical data into a data matrix for training the one or more forecasting models on the historical data;
a training data set database and a testing data set database wherein the hierarchical dataset is divided into training data set and testing data set at the different levels in the hierarchical data set; and
a forecasting data models database configured for storing the one or more forecasting data models wherein forecasting data for the testing data is generated using the training data set at each level through the one or more forecasting data models; and
a neural network configured to identify one or more data attribute weights assigned to the prediction data model at each level of the hierarchical data set and processing the identified weights to determine an optimum data attribute weight for the prediction data model wherein the neural network includes an auto encoder and decoder configured for data compression wherein a LSTM (long short term memory networks) layer is embedded between the auto encoder and decoder of the neural network for identifying temporal variations in a testing data and determining the data attribute weights considering the variations and wherein a demand of the one or more objects is predicted based on the optimized prediction data model associated with the hierarchal data set, wherein the auto encoder is configured to compress the forecasting data and the decoder is configured to compare the compressed forecasting data with a valid coherent forecast data, wherein the processor is configured to execute supply chain operations including inventory management, wherein executing the supply chain operations including inventory management includes determining a required safety stock of the one or more objects based on analysis of the predicted demand and one or more operational characteristics of the one or more objects, wherein the one or more operational characteristics includes category of object, wherein the category of object includes high consumption objects, and wherein the safety stock for high consumption is determined as:

$$S = Z\alpha \times \sqrt{(E(L)\sigma^2 D + (E(D))^2 \sigma^2 L)}$$

where, $\alpha$ is service level and $Z\alpha$ is the inverse distribution function of a standard normal distribution with cumulative probability $\alpha$ of the one or more object;
$E(L)$ and $\sigma L$ are standard deviation of lead time; and
$E(D)$ and $\sigma D$ are standard deviation of demand in each unit time period.

27. The system of claim 26 further comprises:
a data integration component configured to access a data Lake and provide data cleaning and enrichment wherein the component joins an input data to a distributed denormalized table where each row contains all data for an item.

28. The system of claim 27 further comprises:
a forecasting component including a distribution component, a feature transformation component, learning data scripts and an orchestration layer that leverages a high-level data flow abstraction to model machine learning.

29. The system of claim 28 wherein the distribution component is configured to assign group of items to one or more dedicated learning data scripts.

30. The system of claim 29 wherein the feature transformation component converts data into sparse matrices and provides customized and standard transformations.

31. The system of claim 26 wherein the hierarchical data set is linear or non-linear time series data set distributed at different levels in a data hierarchy wherein the objects include raw materials or consumable products.

32. The system of claim 26 wherein the one or more forecasting models include a Stochastic time series data model, time series univariate forecasting data model with error, trend and seasonal model, and random walk (RW) data model.

33. The system of claim 26 wherein a forecast data model generated based on one of the one or more objects is implemented for forecasting demand related to other objects by the AI engine.

34. The system of claim 32, wherein the forecasting data is provided as input to the neural network and testing data as the output to identify the one or more data attribute weights and the optimum data attribute weight is determined from the identified one or more data attribute weights by using a squared loss function of the neural network model/auto encoder model.

35. The system of claim 34 wherein the data attribute weights are determined by:

$$y = \sigma'(W'(\sigma(W\hat{y}+b))+b')$$

where y is
ŷ is input values (forecasts from forecasting data models at different levels)
b (bias of an encoder model) is σ (non-linear function of encoder)
b'=(bias of a decoder model)
W=weights of the encoder model
W'=weights of the decoder model.

36. The system of claim 35 wherein the neural network includes an auto encoder configured to compress the forecasting data by $$Z = \sigma(W\hat{y}+b)$$

where Z is encoder output.

37. The system of claim 36 wherein the neural network includes a decoder configured to compare the compressed forecasting data with a valid coherent forecast data by $$Z\sigma'(W'Z+b')$$

wherein the valid coherent forecast data is the testing data.

38. The system of claim 34 wherein the squared loss function (L) of the neural network is $$L(\hat{y}, y) = |\hat{y}-y|^2 = |\hat{y}-\sigma'(W'(\sigma(W\hat{y}+b))+b')|^2$$

39. The system of claim 36 further comprises:
a LSTM layer embedded between auto encoder and decoder of the neural network for identifying temporal variations in testing data and determining data attribute weights considering the variations.

40. A non-transitory computer-readable storage medium coupled to one or more processors and having instructions stored thereon which, when executed by the one or more processors, cause the one or more processors to perform operations of demand sensing and forecasting, the operations comprising:
receiving and storing at a data lake, a plurality of historical data from an entity;
generating a hierarchical dataset from the received historical data wherein a bot creates a data script based on the received data for generating the hierarchical dataset by utilizing a library of functions stored on a functional database, wherein the hierarchical data set is a linear or non-linear time series data set distributed at different levels in a data hierarchy;
creating one or more forecasting data models by an AI engine for processing the hierarchical data set to predict data trend wherein the AI engine is configured to transform the historical data into a data matrix for training the one or more forecasting models on the historical data;
analyzing by the AI engine, processing results of the one or more forecasting data models at each level of the hierarchal data set to generate a prediction data model;
identifying by a neural network, one or more data attribute weights assigned to the prediction data model at each level of the hierarchical data set and processing the identified weights to determine an optimum data attribute weight for the prediction data model wherein the neural network includes an auto encoder and decoder configured for data compression wherein a LSTM (long short term memory networks) layer is embedded between the auto encoder and decoder of the neural network for identifying temporal variations in a testing data and determining the data attribute weights considering the variations;
dividing the hierarchical dataset into training data set and testing data set at the different levels in the hierarchical dataset;
generating forecasting data for the testing data using the training data set at each level through the one or more forecasting data models;
predicting demand of one or more objects based on the optimized prediction data model associated with the hierarchal data set, wherein the auto encoder is configured to compress the forecasting and the decoder is configured to compare the compressed forecasting data with a valid coherent forecast data; and
executing supply chain operations including inventory management, wherein executing the supply chain operations including inventory management includes determining a required safety stock of the one or more objects based on analysis of the predicted demand and one or more operational characteristics of the one or more objects, wherein the one or more operational characteristics includes category of object, wherein the category of object includes high consumption objects, and wherein the safety stock for high consumption is determined as:

$$S = Z\alpha \times \sqrt{(E(L)\ \sigma^2 D + (E(D))^2 \sigma^2 L}$$

where, α is service level and Zα is the inverse distribution function of a standard normal distribution with cumulative probability α of the one or more object;

E(L) and σL are standard deviation of lead time; and

E(D) and σD are standard deviation of demand in each unit time period.

41. A data processing and data analytics method for demand sensing, forecasting and inventory management, the method comprising:

receiving and storing at a data lake, a plurality of historical data from an entity;

generating a hierarchical dataset from the received historical data, wherein a bot creates a data script based on the received data for generating the hierarchical dataset by utilizing a library of functions stored on a functional database;

creating one or more forecasting data models by an AI engine of a support mechanism for processing the hierarchical dataset to predict data trend, wherein the AI engine is configured to transform the historical data into a data matrix for training the one or more forecasting models on the historical data, wherein the support mechanism includes a demand data categorization and classification engine for cleansing and categorizing objects, a data solver and optimizer for processing variables and optimization parameters, a data extraction and mapping module configured for extracting and mapping object data to category by a clustering script generated through the AI engine, and an API (application programming interface) for triggering the one or more forecasting data models through the processor;

analyzing by the AI engine coupled to a processor, processing results of the one or more forecasting data models at each level of the hierarchal data set based on a hierarchical time series library with a set of exogenous and hyper parameters to generate a prediction data model;

identifying by a neural network, one or more data attribute weights assigned to the prediction data model at each level of the hierarchical data set and processing the identified weights to determine an optimum data attribute weight for the prediction data model, wherein the neural network includes an auto encoder and decoder configured for data compression, wherein a LSTM layer is embedded between he auto encoder and decoder of the neural network for identifying temporal variations in a testing data and determining the data attribute weights considering the variations;

predicting demand of one or more objects based on the optimized prediction data model associated with the hierarchal data set, wherein the optimized prediction data model is determined by parameter tuning on different nodes of a big data tool cluster through group mapping tool;

determining required safety stock of the one or more objects based on analysis of the predicted demand and one or more operational characteristics of the one or more objects;

assigning by an inventory bot, data attribute weights to the one or more operational characteristics at different levels of analytic hierarchy;

processing by the AI engine, the data attribute weights to categorize and classify the one or more objects based on the demand and based on the classification wherein the processor is configured to analyze demand data patterns of the object through classification of the historical data into a hierarchical taxonomy that provides insights into consumption patterns, wherein the AI engine generates clusters from the historical data and the processor is configured to process the data through an unsupervised and nonparametric clustering approach as number of possible clusters are unknown;

determining the required safety stock for each category of the one or more objects, wherein a safety stock for medium consumption category object is determined based on mean and variance as:

if mean×1.1>Variance, then the safety stock is determined by Poisson distribution else if mean×1.1<Variance, then the safety stock is determined by bootstrapping methodology;

and a safety stock for high consumption category object is determined as:

$$S = Z\alpha \times \sqrt{(E(L)\sigma^2 D + (E(D))^2 \sigma^2 L)}$$

where, α is service level and Zα is the inverse distribution function of a standard normal distribution with cumulative probability α of the one or more object;

E(L) and σL are standard deviation of lead time; and

E(D) and σD are standard deviation of demand in each unit time period.

* * * * *